United States Patent
Nishimura et al.

(10) Patent No.: US 8,699,753 B2
(45) Date of Patent: Apr. 15, 2014

(54) OBJECT DETECTING DEVICE, IMAGE DIVIDING DEVICE, INTEGRATED CIRCUIT, METHOD OF DETECTING OBJECT, OBJECT DETECTING PROGRAM, AND RECORDING MEDIUM

(75) Inventors: Takashi Nishimura, Osaka (JP); Akihiko Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 89 days.

(21) Appl. No.: 13/522,151

(22) PCT Filed: Nov. 29, 2011

(86) PCT No.: PCT/JP2011/006684
§ 371 (c)(1),
(2), (4) Date: Jul. 13, 2012

(87) PCT Pub. No.: WO2012/073490
PCT Pub. Date: Jun. 7, 2012

(65) Prior Publication Data
US 2012/0294487 A1   Nov. 22, 2012

(30) Foreign Application Priority Data
Nov. 30, 2010   (JP) ................................ 2010-265915

(51) Int. Cl.
G06K 9/00 (2006.01)
G06K 9/34 (2006.01)
G06K 9/62 (2006.01)
G06T 1/20 (2006.01)

(52) U.S. Cl.
CPC ........ *G06K 9/00228* (2013.01); *G06K 9/00973* (2013.01); *G06K 9/6203* (2013.01); *G06T 1/20* (2013.01)
USPC .......................................... 382/103; 382/173

(58) Field of Classification Search
USPC .................................................. 382/103, 173
See application file for complete search history.

(56) References Cited

U.S. PATENT DOCUMENTS

2009/0324085 A1* 12/2009 Leung et al. ................... 382/190
2010/0119107 A1*  5/2010 Yashiro ......................... 382/100

FOREIGN PATENT DOCUMENTS

| JP | 10-162130 | 6/1998 |
|----|-----------|--------|
| JP | 2000-330928 | 11/2000 |
| JP | 2008-84034 | 4/2008 |
| JP | 2009-295032 | 12/2009 |
| JP | 2010-9405 | 1/2010 |

OTHER PUBLICATIONS

International Search Report issued Jan. 17, 2012 in International (PCT) Application No. PCT/JP2011/006664.

(Continued)

*Primary Examiner* — Amara Abdi
(74) *Attorney, Agent, or Firm* — Wenderoth, Lind & Ponack, L.L.P.

(57) ABSTRACT

An object detection device is provided with a plurality of processor units each detecting an object included in an image. The object detection device generates divided images by dividing the image, taking into consideration both the processing load for detection of an object by each processor element and the transfer load for transfer of the divided images to the processor elements. Independently of each other, the processor elements detect an object in each of the divided images.

11 Claims, 16 Drawing Sheets

(56) References Cited

OTHER PUBLICATIONS

Toshiyuki Kawai et al., "Parallel Ray Tracing Algorithm Using Screen Space Subdivision for Image Generation System MAGG and Its Evaluation", the Transactions of the Institute of Electronics, Information and Communication Engineers, Aug. 25, 1993, vol. J76-D-II, No. 8, pp. 1763-1771 along with English translation.

* cited by examiner

FIG. 5

| | 510 | 520 | 530 | 540 | 550 | 560 | 570 |
|---|---|---|---|---|---|---|---|
| Reduced image ID | Width (pixels) | Height (pixels) | Number of pixels | Number of divisions $N_k$ (number of PEs) | Number of overlapping region pixels | $f_k(N_k)$ | |
| 0 | 640 | 480 | 307,200 | 9 | 61,440 | 64,853 |
| 1 | 576 | 432 | 248,832 | 8 | 48,384 | 55,296 |
| 2 | 518 | 389 | 201,502 | 8 | 43,568 | 46,971 |
| 3 | 467 | 350 | 163,450 | 8 | 39,200 | 40,031 |
| 4 | 420 | 315 | 132,300 | 7 | 30,240 | 34,020 |
| 5 | 378 | 283 | 106,974 | 7 | 27,168 | 28,866 |
| 6 | 340 | 255 | 86,700 | 7 | 24,480 | 24,625 |
| 7 | 306 | 230 | 70,380 | 6 | 18,400 | 20,930 |
| 8 | 275 | 207 | 56,925 | 6 | 16,560 | 17,767 |
| 9 | 248 | 186 | 46,128 | 6 | 14,880 | 15,128 |
| 10 | 223 | 167 | 37,241 | 5 | 10,688 | 12,792 |
| 11 | 201 | 151 | 30,351 | 5 | 9,664 | 10,902 |
| 12 | 181 | 136 | 24,616 | 5 | 8,704 | 9,275 |
| 13 | 163 | 122 | 19,886 | 5 | 7,808 | 7,881 |
| 14 | 146 | 110 | 16,060 | 4 | 5,280 | 6,655 |
| 15 | 132 | 99 | 13,068 | 4 | 4,752 | 5,643 |

FIG. 11

| Reduced image ID 1110 | Width (pixels) 1120 | Height (pixels) 1130 | Number of pixels 1140 | Number of divisions Nk (number of PEs) 1150 | Number of overlapping region pixels 1160 | Number of pixels per processor unit 1170 |
|---|---|---|---|---|---|---|
| 0 | 640 | 480 | 307,200 | 3 | 15,360 | 107,520 |
| 1 | 576 | 432 | 248,832 | 3 | 13,824 | 87,552 |
| 2 | 518 | 389 | 201,502 | 3 | 12,448 | 71,317 |
| 3 | 467 | 350 | 163,450 | 2 | 5,600 | 84,525 |
| 4 | 420 | 315 | 132,300 | 2 | 5,040 | 68,670 |
| 5 | 378 | 283 | 106,974 | 2 | 4,544 | 55,759 |
| 6 | 340 | 255 | 86,700 | 1 | 0 | 86,700 |
| 7 | 306 | 230 | 70,380 | 1 | 0 | 70,380 |
| 8 | 275 | 207 | 56,925 | 1 | 0 | 56,925 |
| 9 | 248 | 186 | 46,128 | 1 | 0 | 46,128 |
| 10 | 223 | 167 | 37,241 | 1 | 0 | 37,241 |
| 11 | 201 | 151 | 30,351 | 1 | 0 | 30,150 |
| 12 | 181 | 136 | 24,616 | 1 | 0 | 24,435 |
| 13 | 163 | 122 | 19,886 | 1 | 0 | 19,886 |
| 14 | 146 | 110 | 16,060 | 1 | 0 | 16,170 |
| 15 | 132 | 99 | 13,068 | 1 | 0 | 13,068 |

FIG. 14

| Reduced image ID /1410 | Width (pixels) /1420 | Height (pixels) /1430 | Number of pixels /1440 | Number of PEs /1450 | Number of overlapping region pixels /1460 | Number of pixels per processor unit /1470 |
|---|---|---|---|---|---|---|
| 0 | 640 | 480 | 307,200 | 16 | 115,200 | 26,400 |
| 1 | 576 | 432 | 248,832 | 16 | 103,680 | 22,032 |
| 2 | 518 | 389 | 201,502 | 16 | 93,360 | 18,429 |
| 3 | 467 | 350 | 163,450 | 16 | 84,000 | 15,466 |
| 4 | 420 | 315 | 132,300 | 12 | 55,440 | 15,645 |
| 5 | 378 | 283 | 106,974 | 9 | 36,352 | 15,925 |
| 6 | 340 | 255 | 86,700 | 7 | 24,576 | 15,897 |
| 7 | 306 | 230 | 70,380 | 6 | 18,400 | 14,797 |
| 8 | 275 | 207 | 56,925 | 5 | 13,248 | 14,035 |
| 9 | 248 | 186 | 46,128 | 4 | 8,928 | 13,764 |
| 10 | 223 | 167 | 37,241 | 3 | 5,344 | 14,195 |
| 11 | 201 | 151 | 30,351 | 3 | 4,800 | 11,717 |
| 12 | 181 | 136 | 24,616 | 2 | 2,160 | 13,388 |
| 13 | 163 | 122 | 19,886 | 2 | 1,952 | 10,919 |
| 14 | 146 | 110 | 16,060 | 2 | 1,760 | 8,910 |
| 15 | 132 | 99 | 13,068 | 1 | 0 | 13,068 |

Reduced image ID = 4

Image region for one PE

Overlapping region

Reduced image ID = 7

Image region for one PE

Reduced image ID = 10

Image region for one PE

OBJECT DETECTING DEVICE, IMAGE DIVIDING DEVICE, INTEGRATED CIRCUIT, METHOD OF DETECTING OBJECT, OBJECT DETECTING PROGRAM, AND RECORDING MEDIUM

TECHNICAL FIELD

The present invention relates to object detection technology for detecting an object, such as a person, in an image. In particular, the present invention relates to object detection technology using parallel processing with a plurality of processor elements.

BACKGROUND ART

A conventional form of technology for detecting an object in an image is the template matching method, whereby an object is detected by scanning a template image that has characteristics of the object over a target image and successively searching for a match.

The amount of calculation for such matching processing within the template matching method is relatively large. Therefore, one approach adopted in object detection devices that use the template matching method is to make the processing time for matching processing relatively shorter by performing the matching processing with a plurality of processor elements that can operate in parallel.

For example, Patent Literature 1 discloses a parallel-processing object detection device provided with a plurality of processor elements, each having a local memory, and a generation unit that generates a plurality of divided images each having a portion that overlaps with another divided image (hereinafter "overlapping region") so that each processor element can perform matching processing independently. In this parallel-processing object detection device, the generation unit generates divided images while taking into consideration the processing load for matching processing performed by each processor element. Each processor element transfers, into its own local memory, the divided image on which the processor element is to perform matching processing. All of the processor elements then perform matching processing in parallel.

CITATION LIST

Patent Literature

Patent Literature 1: Japanese Patent Application Publication No. 2010-9405

SUMMARY OF INVENTION

Technical Problem

In general, when a plurality of processor elements perform matching processing in parallel, the total sum of the processing load for matching processing by all of the processor elements is constant and does not depend on the number of divisions of an image. On the other hand, the total sum of the number of pixels in the divided images increases as the number of divisions of an image increases. This is because as the number of divisions of an image increases, the number of overlapping regions also increases.

As a result, in a parallel-processing object detection device that employs an architecture to successively transfer images to the processor elements, it may occur that only taking into consideration the processing load for matching processing performed by the processor elements may not result in the shortest time upon including both the time necessary for matching processing and the time necessary for image transfer processing (hereinafter referred to as the "processing time for detecting an object").

The present invention has been conceived in light of the above problem, and it is an object thereof to provide an object detection device that, when adopting an architecture to successively transfer images to the processor elements, has a high probability of a shorter processing time for detecting an object than a conventional device.

Solution to Problem

In order to solve the above problem, an object detection device according to the present invention is an object detection device for detecting an object in an image, comprising: a plurality of processor units each configured to refer to an image and perform detection processing to detect an object included in the image; a division unit configured to divide an image into N divided images, each having an overlapping portion with at least another one of the divided images, in order for each of the plurality of processor units to perform the detection processing independently; and a transfer unit configured to transfer the divided images divided by the division unit to the plurality of processor units, each of the processor units performing the detection processing by referring to a transferred image transferred thereto by the transfer unit, and the division unit determining the number N of divided images in accordance with a data amount of the overlapping portion in each divided image to be transferred by the transfer unit and with a processing load for the detection processing to be performed by each of the plurality of processor units.

Advantageous Effects of Invention

With the above structure, the object detection device according to the present invention divides images while taking into consideration both the data amount for transfer of the overlapping regions to be performed by the transfer unit and the processing load for detection processing to be performed by each of the plurality of processor units.

Accordingly, when adopting an architecture to successively transfer images to processor elements, this object detection device has a high probability of a shorter processing time for detecting an object than a conventional device.

BRIEF DESCRIPTION OF DRAWINGS

FIG. 5 is a table listing each number of divisions Nk that minimizes Expression 1.

FIG. 11 is a table listing each number of divisions Nk calculated during the first modified division processing.

FIG. 14 is a table listing each number of divisions Nk calculated during the second modified division processing.

DESCRIPTION OF EMBODIMENTS

Embodiment 1

Overview

As an embodiment of an object detection device according to the present invention, the following describes an image processing device 100 having a function to capture images at a predetermined frame rate and a function to detect the face of a person appearing in each captured image.

Embedded within the image processing device 100 is an object detection device 110 that detects the face of a person appearing in a captured image.

The object detection device 110 is provided with one controller and with 16 processor elements that can independently perform matching processing. First, the controller generates 15 reduced images, reduced at predetermined reduction ratios, from an image captured by the image processing device 100 (hereinafter referred to as an "original image"). Next, the controller generates divided images by dividing the original image and each of the 15 reduced images, taking into consideration both the processing load for matching processing and the transfer load for the images to be transferred to the processor elements. Independently of each other, the processor elements perform matching processing on the divided images.

The following describes the image processing device 100 according to Embodiment 1 in detail with reference to the drawings.

Hardware Configuration of Image Processing Device 100

Figure 1:
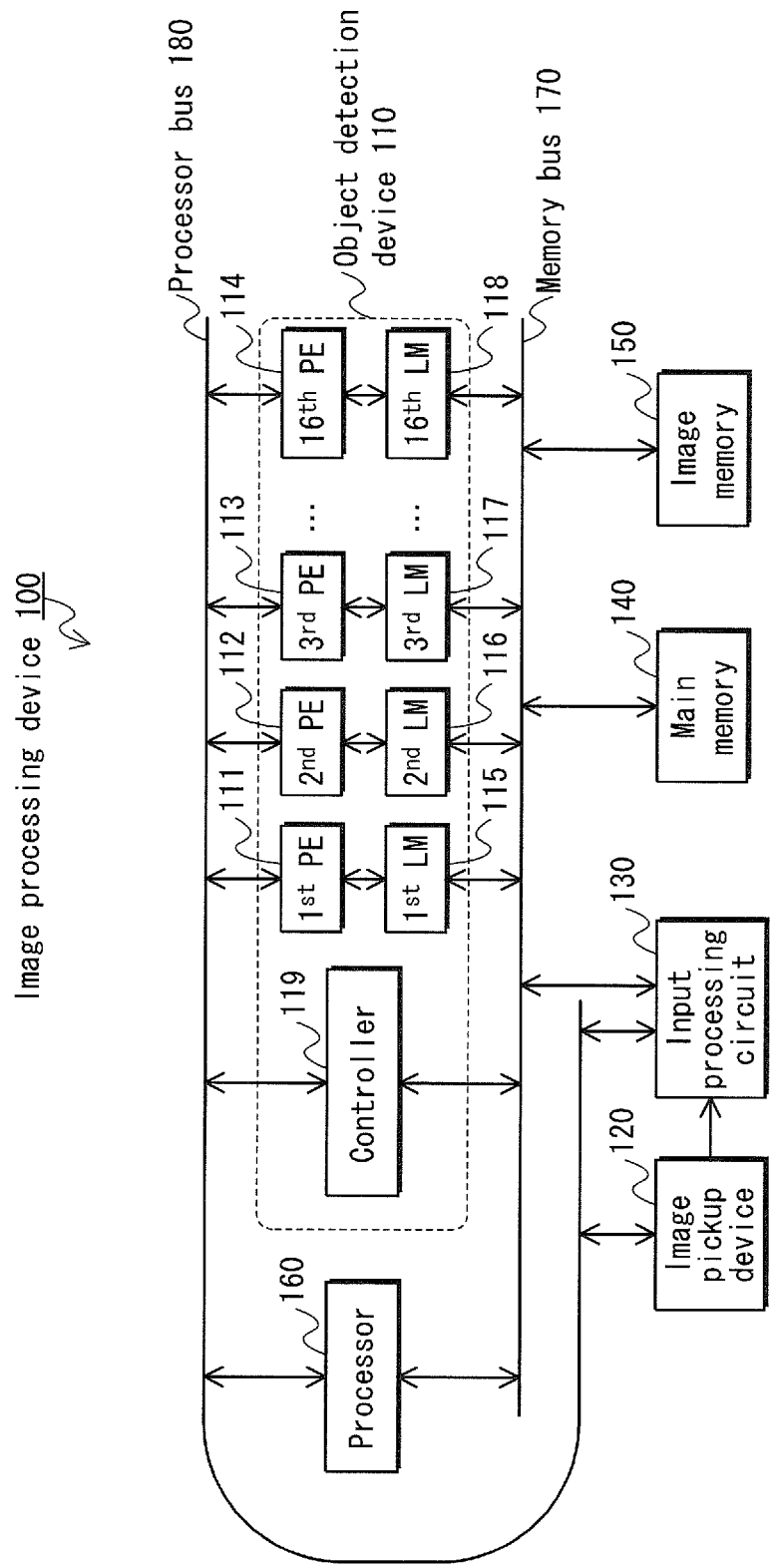
FIG. 1 is a block diagram showing the main hardware configuration of an image processing device 100.

FIG. 1 is a block diagram showing the main hardware configuration of the image processing device 100.

As shown in FIG. 1, the image processing device 100 includes the object detection device 110, an image pickup device 120, an input processing circuit 130, a main memory 140, an image memory 150, a processor 160, a memory bus 170, and a processor bus 180.

The memory bus 170 is connected to the input processing circuit 130, the main memory 140, the image memory 150, the processor 160, and the object detection device 110, and has a function to transmit signals between these components.

The processor bus 180 is connected to the image pickup device 120, the input processing circuit 130, the processor 160, and the object detection device 110 and has a function to transmit signals between these components.

The image memory 150 is connected to the memory bus 170 and is constituted by RAM (Random Access Memory). The image memory 150 stores images used by the object detection device 110.

The main memory 140 is connected to the memory bus 170 and is constituted by RAM and ROM (Read Only Memory).

The main memory 140 stores programs and data used by the processor 160, as well as programs and data used by the object detection device 110.

The image pickup device 120 is connected to the input processing circuit 130 and the processor bus 180 and is controlled by the processor 160 via the processor bus 180. The image pickup device 120 is provided with a solid-state imaging device (such as a COMS (Complementary Metal Oxide Semiconductor) image sensor) and lenses that focus external light on the solid-state imaging device. The image pickup device 120 has a function to capture images of an external subject at a predetermined frame rate (such as 10 fps) and generate original images composed of a predetermined number of pixels (such as 640×480).

The input processing circuit 130 is connected to the image pickup device 120, the memory bus 170, and the processor bus 180 and is controlled by the processor 160 via the processor bus 180. The input processing circuit 130 has a function to write an original image generated by the image pickup device 120 to the image memory 150 via the memory bus 170 and a function to transmit, upon completion of writing of the original image in the image memory 150, an original image writing completion signal to the object detection device 110 via the processor bus 180 in order to indicate completion of writing of the original image.

The processor 160 is connected to the memory bus 170 and the processor bus 180 and has a function execute programs stored in the main memory 140 in order to control the image pickup device 120, the input processing circuit 130, and the object detection device 110 via the processor bus 180, thereby causing the image processing device 100 to achieve its functions of capturing images at a predetermined frame rate and detecting the face of a person appearing in each of the captured images.

The object detection device 110 is connected to the memory bus 170 and the processor bus 180 and is controlled by the processor 160 via the processor bus 180. The object detection device 110 has a function to detect the face of a person appearing in an original image stored by the image memory 150.

As shown in FIG. 1, the object detection device 110 further includes a controller 119, as well as 15 processor elements that can operate independently of each other ($1^{st}$ PE (processor element) 111 through $16^{th}$ PE 114), and 16 local memories ($1^{st}$ LM (local memory) 115 through $16^{th}$ LM 118).

The object detection device 110 is implemented by integrating these constituent elements into one semi-conductor integrated circuit.

The 16 processor elements ($1^{st}$ PE 111 through $16^{th}$ PE 114) each have the same structure and functions. Accordingly, the $1^{st}$ PE 111 is described below.

The $1^{st}$ PE 111 is connected to the $1^{st}$ LM 115 and the processor bus 180 and is controlled by the controller 119 via the processor bus 180. The $1^{st}$ PE 111 has a function to detect the face of a person appearing in an image stored in the $1^{st}$ LM 115 by performing matching processing on the image. The $1^{st}$ PE 111 performs the matching processing by executing a program stored in the $1^{st}$ LM 115.

The 16 local memories ($1^{st}$ LM 115 through $16^{th}$ LM 118) each have the same structure and functions. Accordingly, the $1^{st}$ LM 115 is described below.

The $1^{st}$ LM 115 is connected to the $1^{st}$ PE 111 and the memory bus 170 and is constituted by RAM and ROM. The $1^{st}$ LM 115 stores programs and data used by the $1^{st}$ PE 111, as well as images that are the target of matching processing by the $1^{st}$ PE 111.

The controller 119 is connected to the memory bus 170 and the processor bus 180 and is controlled by the processor 160 via the processor bus 180. The controller 119 has a function to execute programs stored in the main memory 140 in order to control the $1^{st}$ PE 111 through the $16^{th}$ PE 114, via the processor bus 180, thereby causing the object detection device 110 to achieve its function of detecting the face of a person appearing in an original image stored in the image memory 150.

The following describes the object detection device 110 in more detail with reference to the drawings.

Object Detection Device 110

Figure 2:
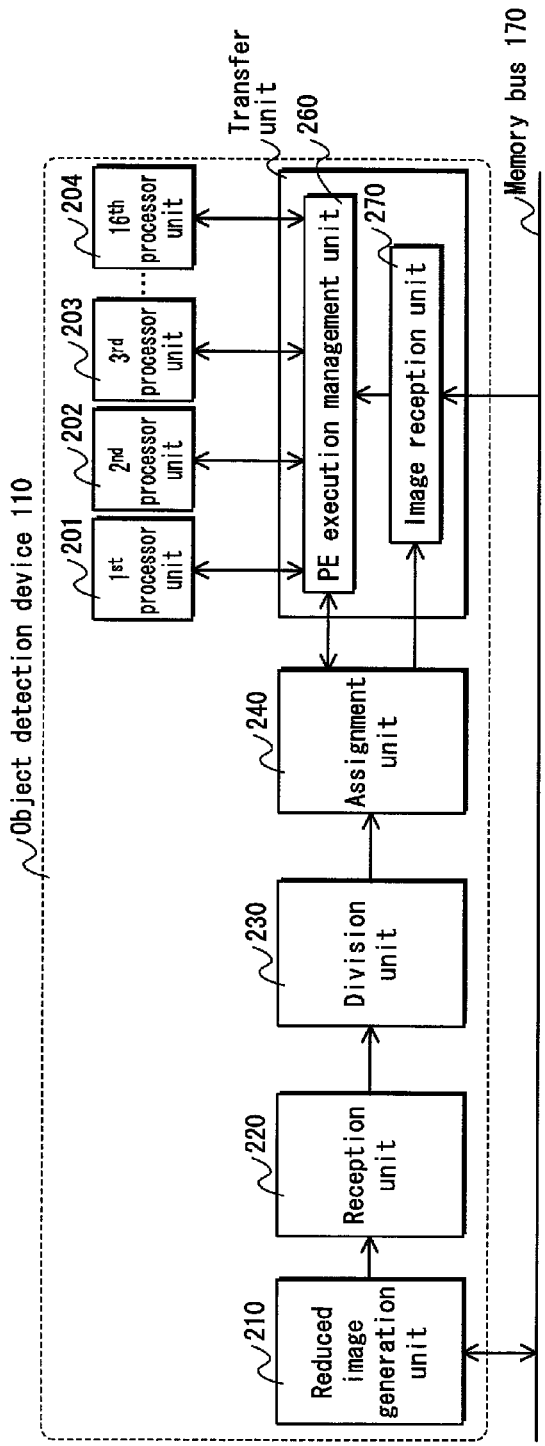
FIG. 2 is a functional block diagram of an object detection device 110.

FIG. 2 is a functional block diagram showing functions achieved by execution of programs by the object detection device 110 provided with the above hardware configuration.

As shown in FIG. 2, the object detection device 110 includes 16 processor units ($1^{st}$ processor unit 201 through $16^{th}$ processor unit 204), a reduced image generation unit 210, a reception unit 220, a division unit 230, an assignment unit 240, and a transfer unit 250. The transfer unit 250 further includes a PE execution management unit 260 and an image reception unit 270.

The 16 processor units ($1^{st}$ processor unit 201 through $16^{th}$ processor unit 204) each have the same structure and functions. Accordingly, the $1^{st}$ processor unit 201 is described below.

The $1^{st}$ processor unit 201 is implemented by the $1^{st}$ PE 111, which executes a program, and the $1^{st}$ LM 115. The $1^{st}$ processor unit 201 is connected to the PE execution management unit 260 and has the following four functions.

Image storage function: a function to store an image on which to perform matching processing.

Template image storage function: a function to store a plurality (for example, 1000) of 20 pixel×20 pixel template images having characteristics of a person's face.

Detection function: a function to detect the face of a person appearing in a stored image by performing matching processing on the image using the stored template images.

Completion notification function: a function to output a matching processing completion signal to the PE execution management unit upon completion of matching processing on the stored image.

Figure 3:
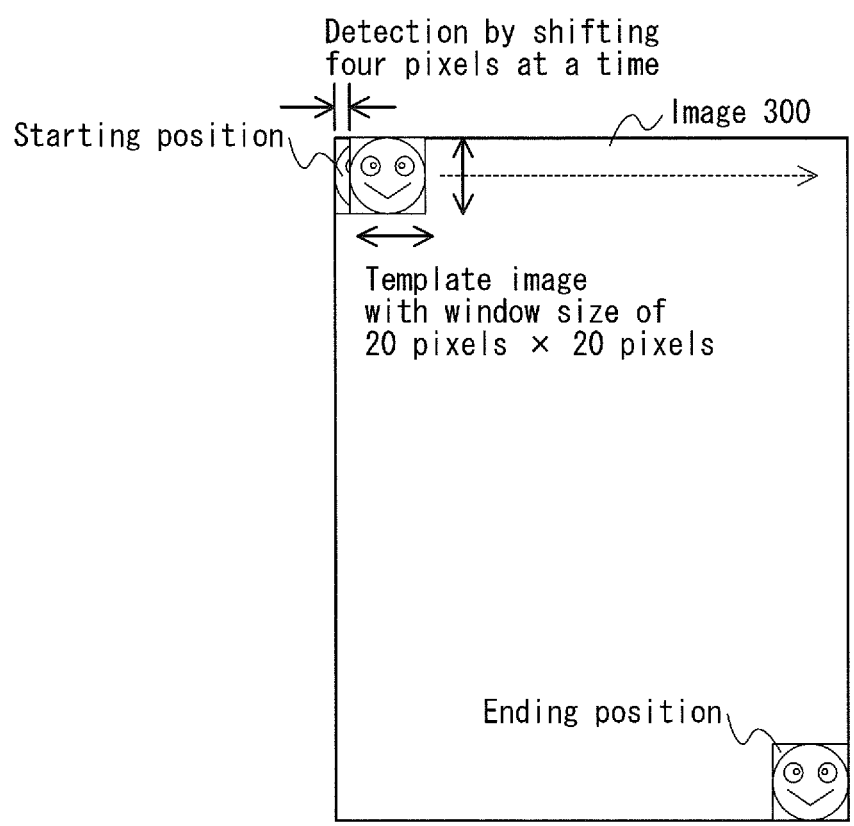
FIG. 3 is a schematic diagram showing matching processing.

FIG. 3 is a schematic diagram illustrating the matching processing that the $1^{st}$ processor unit 201 performs on an image using template images.

As shown in FIG. 3, the $1^{st}$ processor unit 201 performs matching processing on a target image 300 by successive comparison with template images, shifting each template image four pixels at a time to scan over the target image 300.

The $1^{st}$ processor unit 201 performs the scanning in the following order. The $1^{st}$ processor unit 201 begins scanning from the upper-left corner of the image 300, first scanning to the right edge of the image by horizontally shifting the template image four pixels at a time. When scanning reaches the right edge of the image 300, the $1^{st}$ processor unit 201 vertically shifts the template image by four pixels, and scanning continues from the left edge to the right edge of the image 300. The $1^{st}$ processor unit 201 repeats this process from the top row to the bottom row, thus scanning from the upper left to the lower right of the image 300. Scanning is complete upon reaching the lower right of the image 300.

Even if the $1^{st}$ processor unit 201 detects the face of a person before scanning reaches the lower right of the image 300, scanning does not terminate, but rather continues until reaching the lower right of the image 300.

Returning to FIG. 2, the description of the object detection device 110 continues below.

The reduced image generation unit 210 is implemented by the controller 119 executing a program. The reduced image generation unit 210 is connected to the memory bus 170 and the reception unit 220 and has the following five functions.

Reduced image generation function: a function to read an original image from the image memory 150 upon receiving an original image writing completion signal from the input processing circuit 130 via the processor bus 180 and to generate 15 reduced images from the read original image, successively reducing the images at a 90% vertical reduction rate and a 90% horizontal reduction rate.

Reduced image ID assigning function: a function to associate the read original image and each of the generated reduced images with a reduced image ID for identifying the reduced images. In this embodiment, the original image is assigned a reduced image ID of 0, whereas the reduced images are respectively assigned reduced image IDs of 1, 2, 3, . . . , 15 in order from the smallest reduction rate.

Reduced image pixel calculation function: a function to calculate the number of pixels constituting the read original image and each of the generated reduced images, to associate the corresponding reduced image ID with each calculated number of pixels, and to transmit the result to the reception unit 220.

Reduced image writing function: a function to write each generated reduced image in the image memory 150 in association with the reduced image ID assigned thereto, to associate the reduced image IDs with the addresses that are written to, and to transmit the result to the reception unit 220.

Reduction completion signal outputting function: a function to transmit a reduction completion signal to the reception unit 220 upon completion of writing of all of the reduced images in the image memory 150.

The reception unit 220 is implemented by the controller 119 executing a program. The reception unit 220 is connected to the reduced image generation unit 210 and the division unit 230 and has the following reception function.

Reception function: a function to transmit to the division unit 230, upon receipt of the reduction completion signal from the reduced image generation unit 210, each number of pixels corresponding to a reduced image ID and the address corresponding to each reduced image ID as received from the reduced image generation unit 210.

The division unit 230 is implemented by the controller 119 executing a program. The division unit 230 is connected to the reception unit 220 and the assignment unit 240 and has the following three functions.

Calculation of number of divisions function: a function to calculate the number of divisions Nk that minimizes Expression 1 for an image whose reduced image ID is k.

$$\sum_{k=0}^{15} fk(Nk) \text{ where}$$

$$fk(Nk) = \begin{cases} \text{if } Nk > 1 : (X0 \cdot Rx^k \cdot Y0 \cdot Ry^k)/Nk + Rt \cdot (Nk-1) \cdot GDB \cdot Y0 \cdot Ry^k \\ \text{if } Nk = 1 : (X0 \cdot Rx^k \cdot Y0 \cdot Ry^k)/Nk \end{cases}$$

Expression 1

In Expression 1, X0 is the number of pixels in the original image in the horizontal direction. In this embodiment, X0 is 640. Y0 is the number of pixels in the vertical direction. In this embodiment, Y0 is 480. Rx is the reduction rate in the vertical direction and is 0.9 in this embodiment. Ry is the reduction rate in the horizontal direction and is 0.9 in this embodiment. Rt is the ratio of the processing time per pixel when the PE unit performs matching processing to the transfer time per pixel when transferring an image to the processor unit. In this embodiment, Rt is 0.5. This ratio is obtained by measurement through experiment. GDB is the number of pixels in the horizontal direction in the overlapping region included in a divided image when an image is divided horizontally to generate divided images. In this embodiment, GDB is 16. The value of GDB is determined by subtracting the number of pixels by which a template image is shifted during scanning (here, 4) from the number of pixels of the template image in the horizontal direction (here, 20).

The portion of Expression 1 represented by Expression 2 is the number of pixels in a reduced image whose reduced image ID is k divided by the number of divisions Nk. This value indicates the processing time for matching processing by a processor unit on the image whose reduced image ID is k.

$$(X0 \cdot Rx^k \cdot Y0 \cdot Ry^k)/Nk \qquad \text{Expression 2}$$

The portion of Expression 1 represented by Expression 3 is the number of pixels (Expression 4) in the overlapping regions that occur due to dividing the image whose reduced image ID is k, multiplied by Rt. This value indicates the transfer time for transferring the pixels in the overlapping regions of the image whose reduced image ID is k to a processor unit.

$$Rt \cdot (Nk-1) \cdot GDB \cdot Y0 \cdot Ry^k \qquad \text{Expression 3}$$

$$(Nk-1) \cdot GDB \cdot Y0 \cdot Ry^k \qquad \text{Expression 4}$$

Accordingly, fk(Nk) is the sum, with respect to the reduced image whose reduced image ID is k, of (i) the processing time for matching processing by the processor units and (ii) the transfer time for transferring the pixels in the overlapping regions to the processor units.

The value of Nk that minimizes Expression 1 may be sought by, for example, calculating Expression 1 by substituting integers from 1 to M, i.e. 1, 2, 3, . . . , M (M being an integer sufficiently larger than 15) for the value of Nk and then selecting the value of Nk yielding the smallest value for Expression 1.

Figure 4:
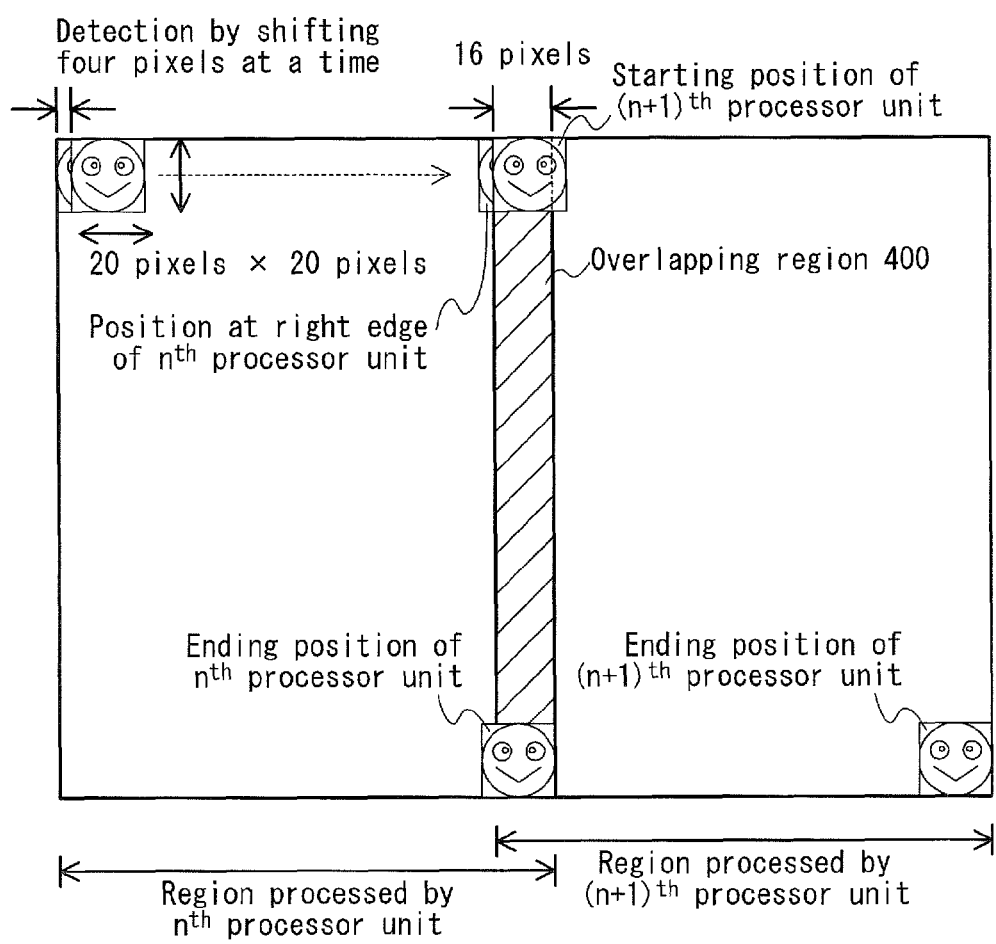
FIG. 4 is a schematic diagram visually representing an overlapping region during matching processing.

FIG. 4 is a schematic diagram visually representing an overlapping region that becomes necessary when dividing an image.

In FIG. 4, the image is vertically divided in two. FIG. 4 schematically shows columns when the $n^{th}$ processor unit and the $(n+1)^{th}$ processor unit perform matching processing on the respective divided images.

As shown in FIG. 4, when scanning by shifting a 20 pixel× 20 pixel template image four pixels at a time, the $n^{th}$ processor unit and the $(n+1)^{th}$ processor unit must use pixels in an overlapping region that is 20 pixels−4 pixels=16 pixels wide in order to perform a scan that is equivalent to the scan in the image before division.

FIG. 5 shows each number of divisions Nk that minimizes Expression 1 given that X0 is 640, Y0 is 400, Rx is 0.9, Ry is 0.9, Rt is 0.5, and GDB is 16.

In FIG. 5, the reduced image ID 510 is an identifier assigned to each reduced image in order to identify the reduced images. The width (pixels) 520 is the horizontal number of pixels of the reduced image identified by the corresponding reduced image ID 510. The height (pixels) 530 is the vertical number of pixels of the reduced image identified by the corresponding reduced image ID 510. The number of pixels 540 is the number of pixels in the image identified by the corresponding reduced image ID 510. The number of divisions Nk (number of PEs) 550 is the number of divisions that minimizes Expression 1 for the image identified by the corresponding reduced image ID 510. The number of overlapping region pixels 560 is the sum of the number of pixels in each overlapping region that is produced when dividing the image identified by the corresponding reduced image ID 510 by the corresponding number of divisions Nk (number of PEs) 550. Finally, fk(Nk) 570 is the value of fk(Nk) when dividing the image identified by the corresponding reduced image ID 510 by the corresponding number of divisions Nk (number of PEs) 550.

Returning again to FIG. 2, the following continues the description of the division unit 230.

Division function: a function to generate divided images by vertically dividing the original image and the 15 reduced images based on the calculated number of divisions Nk, so that the processor units perform matching processing independently of each other. Note that for an image with a value of 1 for Nk, the divided image that is generated is the same as the image before division.

Address generation function: a function to generate, for each divided image that is generated, an address pointing to the storage region where the pixels constituting the divided image are stored in the image memory 150.

The assignment unit 240 is implemented by the controller 119 executing a program and is connected to the division unit 230 and the transfer unit 250. The assignment unit 240 has a function to assign each divided image generated by the division unit 230 to one of the $1^{st}$ processor unit 201 through the $16^{th}$ processor unit 204. Details on the method of assignment of divided images by the assignment unit 240 are described below in the section on steps S630 through S655 of object detection processing.

The image reception unit 270 is implemented by the controller 119 executing a program and is connected to the memory bus 170, the assignment unit 240, and the PE execution management unit 260. The image reception unit 270 has a function to use the addresses generated by the assignment unit 240 to read the divided images generated by the division unit 230 from the image memory 150 via the memory bus 170.

The PE execution management unit 260 is implemented by the controller 119 executing a program. The PE execution management unit 260 is connected to the $1^{st}$ processor unit 201 through the $16^{th}$ processor unit 204, the assignment unit 240, and the image reception unit 270, and has the following two functions.

Image transfer function: a function to transfer a divided image read by the image reception unit 270 to the processor unit assigned by the assignment unit 240.

Completion notification function: a function, upon receipt of a matching processing completion signal from any of the processor units, to transmit the matching processing completion signal to the assignment unit 240.

With reference to the drawings, the following describes operations by the object detection device 110 provided with the above structure.

Operations

The following describes characteristic operations among operations by the object detection device 110, namely object detection processing.

Object Detection Processing

Object detection processing is processing to detect the face of a person appearing in an original image stored in the image memory 150.

Figure 6:
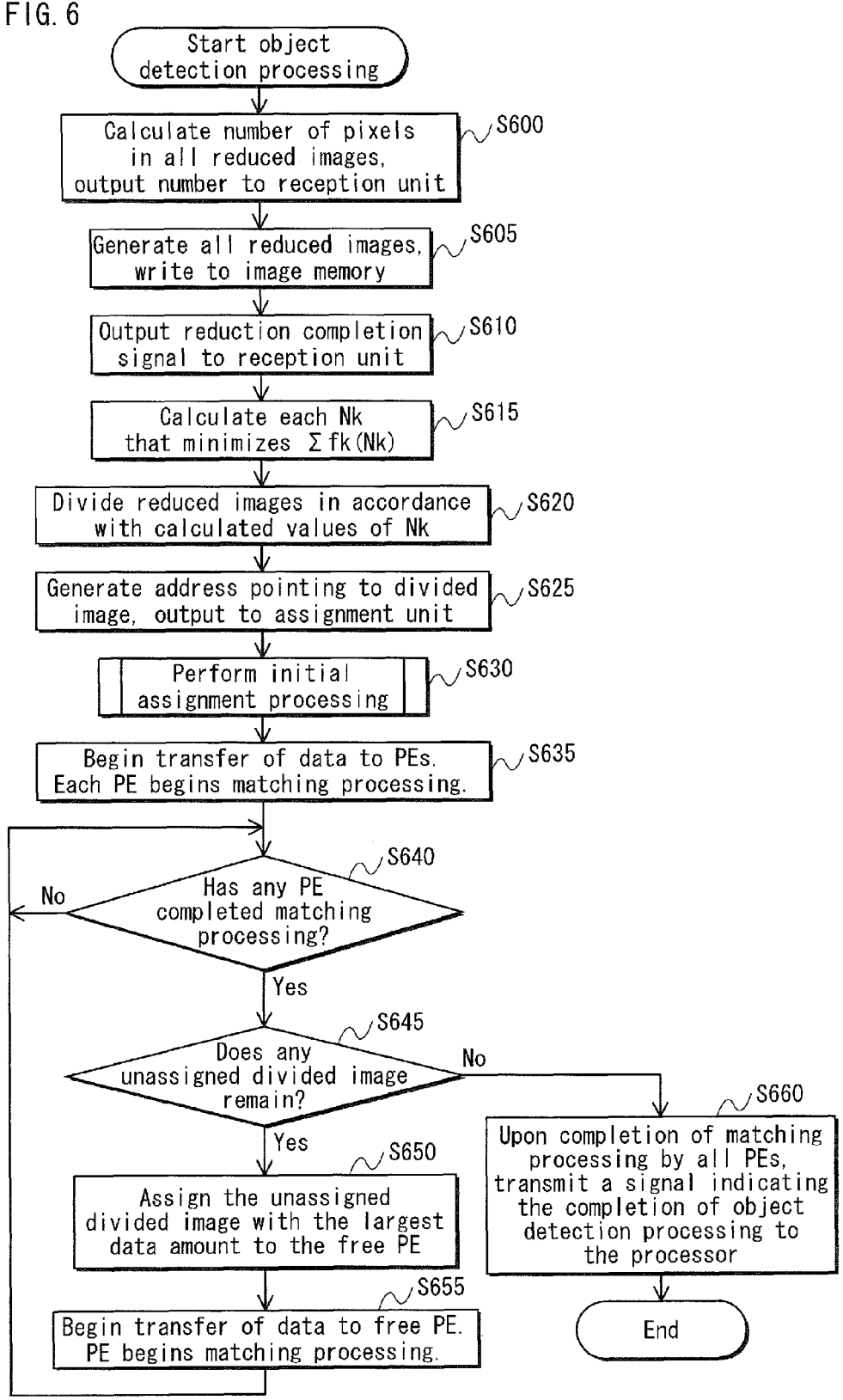
FIG. 6 is a flowchart of object detection processing.

FIG. 6 is a flowchart of object detection processing.

Object detection processing begins when the reduced image generation unit 210 receives an original image writing completion signal from the input processing circuit 130 via the processor bus 180.

Upon the start of object detection processing, the reduced image generation unit 210 reads an original image from the image memory 150 and associates reduced image IDs for identifying reduced images with the read original image and 15 reduced images that are to be generated. The reduced image generation unit 210 calculates the number of pixels constituting the read original image and each of the reduced images that are to be generated and transmits each calculated number of pixels to the reception unit 220 along with the corresponding image ID (step S600).

Upon transmitting the calculated numbers of pixels to the reception unit 220, the reduced image generation unit 210 then generates 15 reduced images by successively reducing the original image at a 90% vertical reduction rate and a 90% horizontal reduction rate. The reduced image generation unit 210 writes the reduced images thus generated to the image memory 150, transmits each writing address to the reception unit 220 (step S605), and transmits a reduction completion signal to the reception unit 220 upon completion of writing of all of the reduced images (step S610).

Upon receipt of the reduction completion signal, the reception unit 220 transmits, to the division unit 230, each number of pixels corresponding to a reduced image ID and the address corresponding to each reduced image ID as received from the reduced image generation unit 210. The division unit 230 calculates each number of divisions Nk that minimizes Expression 1 (step S615).

Upon calculating each number of divisions Nk, the division unit 230 generates divided images by vertically dividing the original image and each of the reduced images based on the calculated number of divisions Nk (step S620). For each divided image that is generated, the division unit 230 generates an address pointing to the storage region in the image memory 150 storing the pixels constituting the divided image and outputs the address to the assignment unit 240 (step S625).

Upon receiving the addresses, the assignment unit 240 begins the following initial assignment processing (step S630).

Initial Assignment Processing

Initial assignment processing is processing for the first assignment of divided images to processor units after the start of object detection processing. This processing assigns one divided image to each of the 16 processor units to which no divided image has been assigned.

Figure 7:
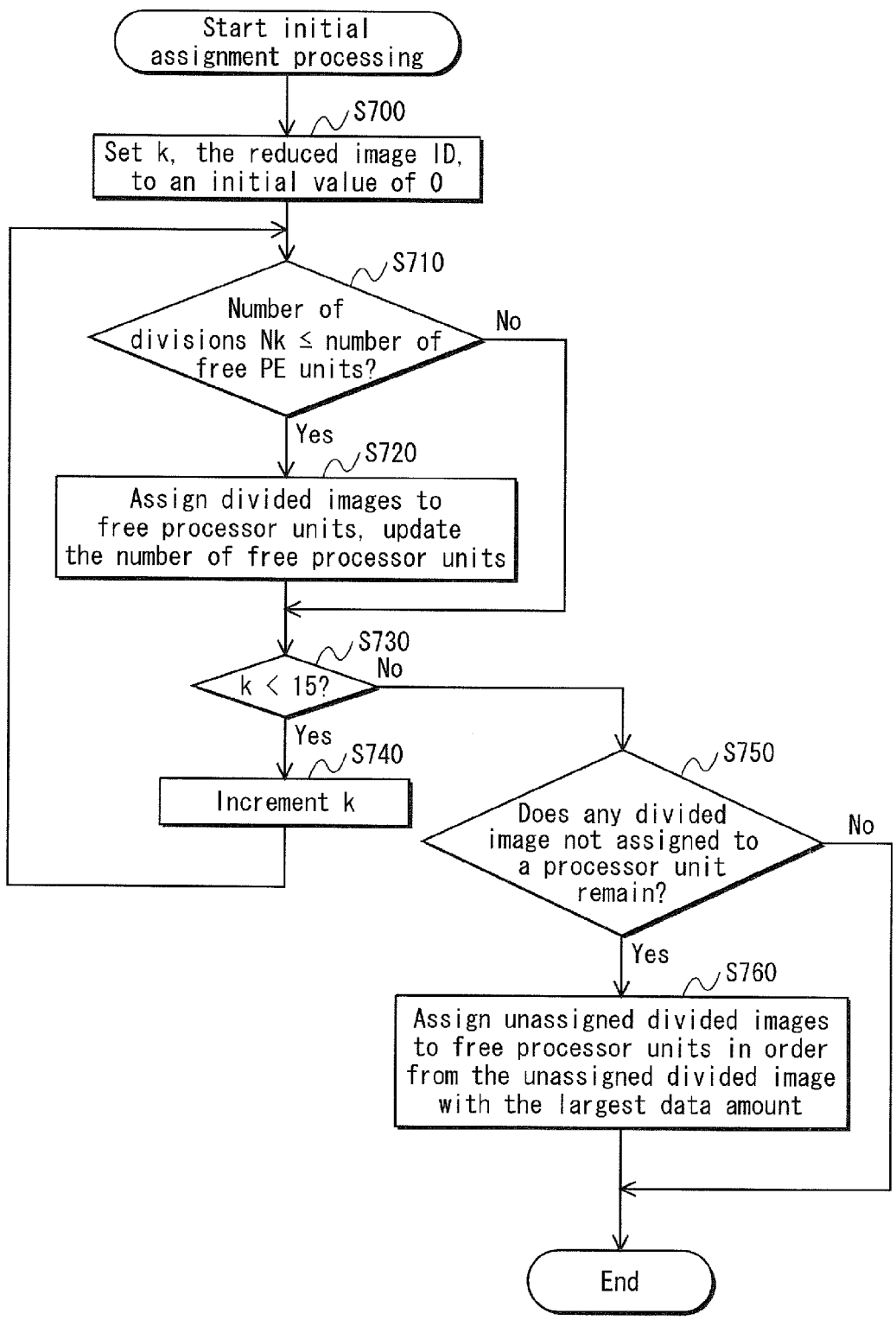
FIG. 7 is a flowchart of initial assignment processing.

FIG. 7 is a flowchart of initial assignment processing.

Upon the start of initial assignment processing, the assignment unit 240 first sets k, the reduced image ID, to an initial value of 0 (step S700).

Next, the assignment unit 240 determines whether, for reduced image ID=k, the number of divisions Nk calculated by the division unit 230 is equal to or less than the number of processor units to which no divided image has been assigned (hereinafter referred to as "free processor units"; step S710).

If the number of divisions Nk is less than or equal to the number of free processor units in step S710 (step S710: Yes), then the assignment unit 240 assigns one divided image to each of Nk free processor units and updates the number of free processor units (step S720).

When the processing in step S720 is complete, or if the number of divisions Nk is not less than or equal to the number of free processor units in step S710 (step S710: No), then the assignment unit 240 determines whether k is less than 15 (step S730).

If k is less than 15 in step S730 (step S730: Yes), the assignment unit 240 increments k by one (step S740) and repeats processing from step S710 onwards.

If k is not less than 15 in step S730 (step S730: No), the assignment unit 240 checks whether any divided image that has not been assigned to a processor unit (hereinafter referred to as an "unassigned divided image") remains (step S750).

If any unassigned divided image remains in step S750 (step S750: Yes), the assignment unit 240 assigns unassigned divided images to free processor units in order from the unassigned divided image with the largest data amount (step S760). The assignment unit 240 continues to assign unassigned divided images to free processor units until either no free processor unit or no unassigned divided image remains.

When the processing in step S760 terminates, or if no unassigned divided image remains in step S750 (step S750: No), the assignment unit 240 terminates initial assignment processing.

Returning to FIG. 6, the description of object detection processing continues below.

Upon termination of initial assignment processing in step S630, the image reception unit 270 begins to read, from the image memory 150, the divided images assigned to processor units by the assignment unit 240. The PE execution management unit 260 begins to transfer the divided images whose reading has begun to the respective processor units assigned by the assignment unit 240. The processor units begin matching processing upon receiving the respective divided images (step S635).

The processor units begin matching processing at the point at which they receive data necessary for starting matching processing. There is no need to delay the start of matching processing until after receiving all of the data in a divided image.

Subsequently, upon receipt of a matching processing completion signal, indicating completion of matching processing, from any of the processor units (when the result of step S640 is Yes after a repeated result of No), the PE execution management unit 260 transmits the matching processing completion signal to the assignment unit 240.

Upon receipt of the matching processing completion signal, the assignment unit 240 determines whether any unassigned divided image remains (step S645).

If any unassigned divided image remains in step S645 (step S645: Yes), the assignment unit 240 assigns the unassigned divided image with the largest data amount to the free processor unit that transmitted the matching processing completion signal (step S650).

Upon termination of the processing in step S650, the image reception unit 270 begins to read, from the image memory 150, a divided image newly assigned by the assignment unit 240. The PE execution management unit 260 begins to transfer the divided image whose reading has begun to the processor unit assigned by the assignment unit 240. The processor unit begins matching processing upon receiving the divided image (step S655).

Subsequently, the PE execution management unit 260 returns to step S640 and repeats the processing from step S640 onwards.

If no unassigned divided image remains in step S645 (step S645: No), then upon completion of matching processing by all of the processor units, the assignment unit 240 transmits a signal indicating the completion of object detection processing to the processor 160 (step S660). The object detection device 110 thus terminates object detection processing.

Considerations

The object detection device 110 with the above structure generates 15 reduced images from an original image captured by the image pickup device 120, calculates a number of divisions Nk that minimizes Expression 1 for the original image and each of the 15 reduced images that are generated, and divides each of the images. The transfer unit 250 then transfers the divided images to respective processor units. The processor units perform matching processing on the respective divided images transferred thereto.

Accordingly, the object detection device 110 divides images by taking into consideration both the data amount of the overlapping regions in the images to be transferred by the transfer unit 250 and the processing load for matching processing to be performed by the processor units.

Embodiment 2

Overview

As an embodiment of an object detection device according to the present invention, the following describes a first modified image processing device that is a partial modification of the image processing device 100 according to Embodiment 1. The first modified image processing device has the same hardware configuration as the image processing device 100 according to Embodiment 1. A portion of the executed software, however, is modified from the image processing device 100 according to Embodiment 1. Furthermore, the first modified image processing device includes a first modified object detection device that is a modification of the object detection device 110 in the image processing device 100 according to Embodiment 1.

The algorithm for determining the number of divisions of a reduced image in the object detection device 110 according to Embodiment 1 is an example of a structure for taking into consideration both the data amount of the overlapping regions in the images to be transferred by the transfer unit 250 and the processing load for matching processing to be performed by the processor units. By contrast, the algorithm for determining the number of divisions of a reduced image in the first modified object detection device is an example of a structure for taking into consideration the processing load for matching processing to be performed by the processor units, without consideration of the data amount of the overlapping regions of the images to be transferred by the transfer unit 250.

The following describes the structure of the first modified object detection device according to Embodiment 2 with reference to the drawings, focusing on the differences from the object detection device 110 according to Embodiment 1.

Structure

In the first modified object detection device, the division unit 230 of the object detection device 110 according to Embodiment 1 (see FIG. 2) is modified to a division unit 800.

Accordingly, the division unit 800 is described below.

The division unit 800 is implemented by the controller 119 executing a program. In addition to the division function and the address generation function that the division unit 230 according to Embodiment 1 has, the division unit 800 has the following first modified calculation of number of divisions function.

First modified calculation of number of divisions function: a function to calculate the number of divisions Nk for each image so as to balance the processing load for matching processing to be performed by the processor units on the original image and all of the reduced images.

Details on the method of calculating the number of divisions Nk for each image in the first modified calculation of number of divisions function are provided below in the section on first modified division processing.

Figure 8:
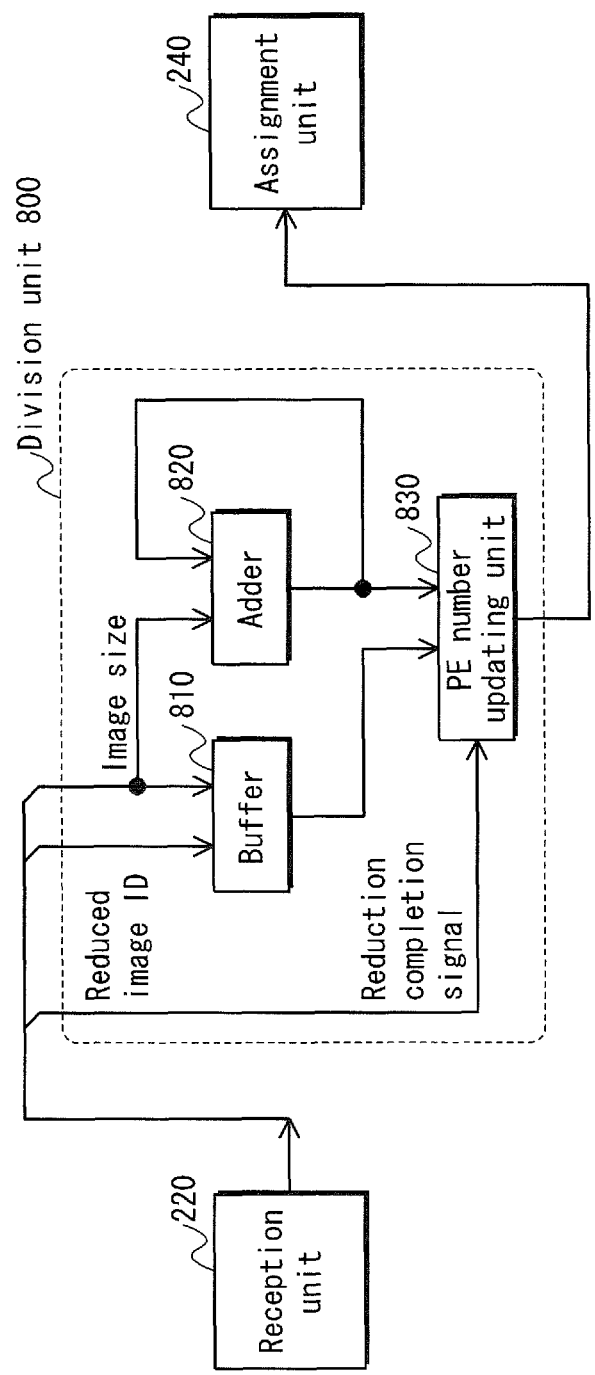
FIG. 8 is a functional block diagram of a division unit 800.

FIG. 8 is a functional block diagram showing the functional structure of the division unit 800.

As shown in FIG. 8, the division unit 800 includes a buffer 810, an adder 820, and a PE number updating unit 830.

The adder 820 is implemented by the controller 119 executing a program and is connected to the reception unit 220 and the PE number updating unit 830. The adder 820 has a function to receive, from the reception unit 220, the number of pixels associated with each reduced image ID, to calculate a total number of pixels by cumulatively adding each received number of pixels, and to output the calculated total number of pixels to the PE number updating unit 830.

The buffer 810 is implemented by the controller 119 executing a program and is connected to the reception unit 220 and the PE number updating unit 830. The buffer 810 has a function to store each reduced image ID, as well as the number of pixels corresponding to each reduced image ID, received from the reception unit 220.

The PE number updating unit 830 is implemented by the controller 119 executing a program and is connected to the buffer 810, the adder 820, and the assignment unit 240. The PE number updating unit 830 has a function to read the reduced image IDs and the number of pixels corresponding to each reduced image ID from the buffer 810 and to calculate the number of divisions Nk for each image by comparison with the total number of pixels received from the adder 820. Details on the method of calculating the number of divisions Nk for each image are provided below in the section on the first modified division processing.

With reference to the drawings, the following describes operations by the first modified object detection device provided with the above structure.

Operations

The following describes characteristic operations among operations by the first modified object detection device, namely first modified object detection processing.

First Modified Object Detection Processing

Like the object detection processing according to Embodiment 1, the first modified object detection processing is processing to detect the face of a person appearing in an original image stored in the image memory 150.

Figure 9:
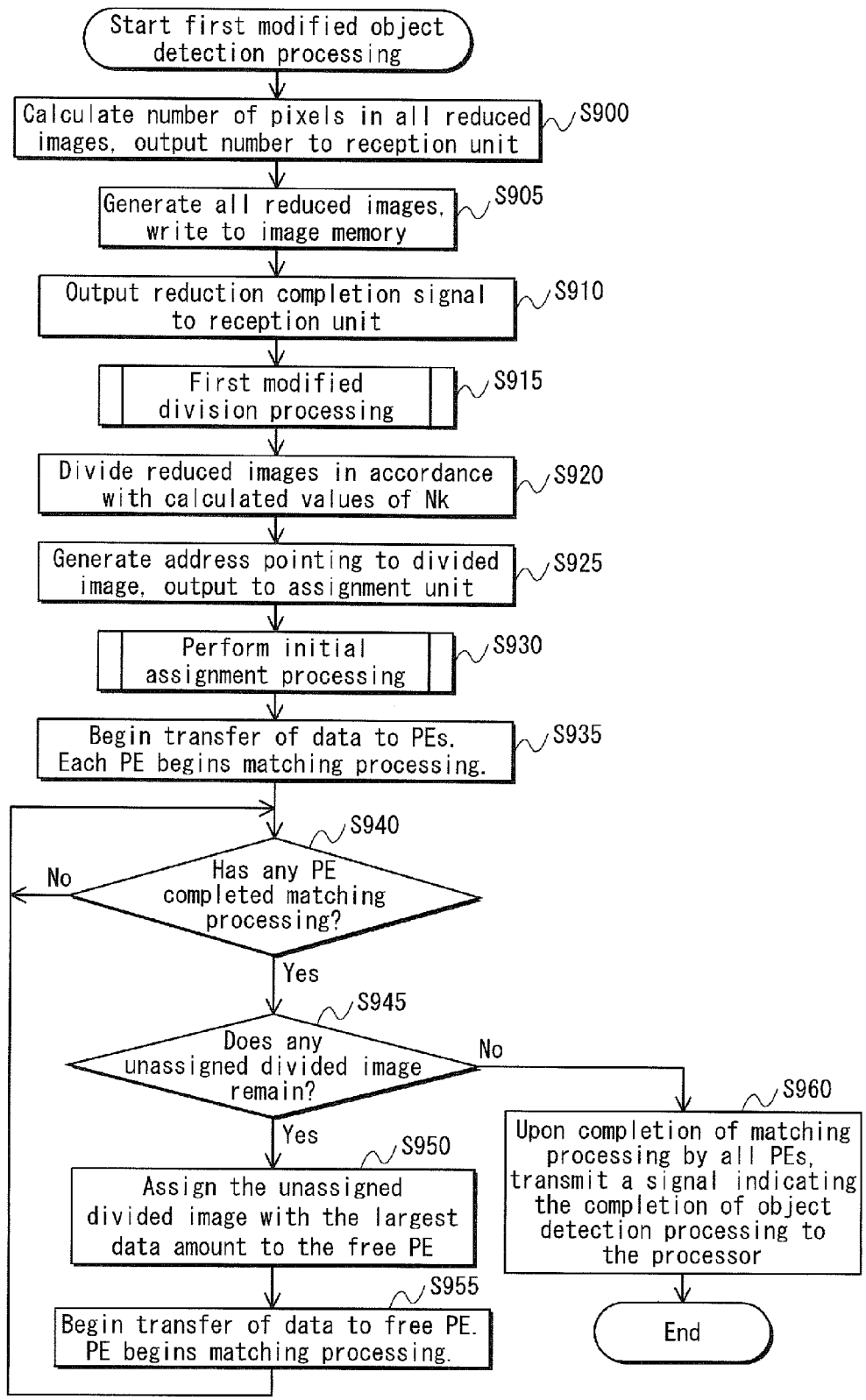
FIG. 9 is a flowchart of first modified object detection processing.

FIG. 9 is a flowchart of the first modified object detection processing.

In the first modified object detection processing, a portion of the object detection processing according to Embodiment 1 (see FIG. 6) is modified. Specifically, the difference between the object detection processing in Embodiment 1 and the first modified object detection processing is that the processing in step S615 in Embodiment 1 is modified to first modified division processing in step S915.

Accordingly, the first modified division processing is described below.

First Modified Division Processing

The first modified division processing is processing whereby the first modified object detection device calculates the number of divisions Nk for each image.

Figure 10:
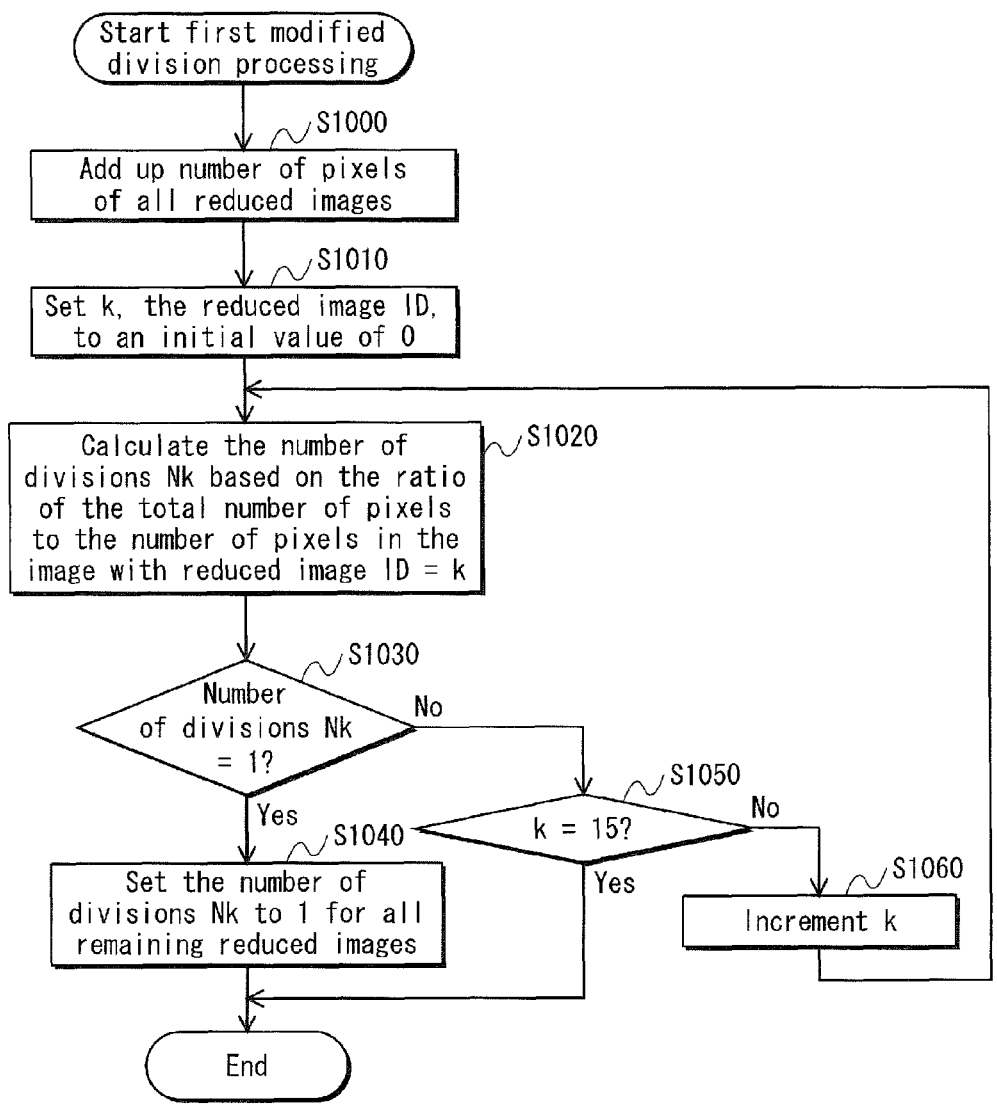
FIG. 10 is a flowchart of first modified division processing.

FIG. 10 is a flowchart of the first modified division processing.

The first modified division processing begins when the reduced image generation unit 210 transmits a reduction completion signal to the reception unit 220 during the processing in step S910 of the first modified object detection processing.

Upon the start of the first modified division processing, the reception unit 220 transmits, to the division unit 800, each number of pixels corresponding to a reduced image ID and the address corresponding to each reduced image ID as received from the reduced image generation unit 210. The adder 820 of the division unit 800 then calculates the total number of pixels by adding each received number of pixels, outputting the result to the PE number updating unit 830 (step S1000).

Upon receiving the total number of pixels, the PE number updating unit 830 first sets k, the reduced image ID, to an initial value of 0 (step S1010).

Next, the PE number updating unit 830 compares the total number of pixels with the number of pixels in the reduced image whose reduced image ID is k. The PE number updating unit 830 then calculates the number of divisions Nk so that the ratio of the total number of pixels to the number of pixels in the reduced image equals the ratio between the total number of processor units (in this embodiment 16) and the number of divisions Nk (step S1020). At this point, the calculated number of divisions Nk is calculated as an integer by discarding any value after the decimal point.

Upon calculating the number of divisions Nk, the PE number updating unit 830 determines whether the calculated Nk is one (step S1030).

If the calculated Nk is one in step S1030 (step S1030: Yes), the PE number updating unit 830 sets the number of divisions Nk to one for all of the images that are larger than the reduced image ID k (step S1040).

If the calculated number of divisions Nk is not one in step S1030 (step S1030: No), then the PE number updating unit 830 determines whether k is 15 (step S1050).

If k is not 15 in step S1050 (step S1050: No), the PE number updating unit 830 increments k by one (step S1060). Processing then returns to step S1020, with the processing from step S1020 onward being repeated.

Upon termination of the processing in step S1040, or if k is 15 in step S1050 (step S1050: Yes), the first modified object detection device terminates the first modified division processing.

FIG. 11 shows each number of divisions Nk calculated during the first modified division processing given that X0 is 640, Y0 is 400, Rx is 0.9, Ry is 0.9, Rt is 0.5, and GDB is 16.

In FIG. 11, the reduced image ID 1110, the width (pixels) 1120, the height (pixels) 1130, the number of pixels 1140, and the number of overlapping region pixels 1160 are the same as the reduced image ID 510, the width (pixels) 520, the height (pixels) 530, the number of pixels 540, and the number of overlapping region pixels 560 in FIG. 5. The number of divisions Nk (number of PEs) 1150 is the number of divisions calculated during the first modified division processing for the image identified by the corresponding reduced image ID 1110. The number of pixels per processor unit 1170 is the number of pixels per processor unit when an image identified by a corresponding reduced image ID 510 is divided by the corresponding number of divisions Nk (number of PEs) 1150.

Considerations

The first modified object detection device with the above structure calculates the number of divisions Nk for each image so that the ratio of the total number of pixels to the number of pixels in a target image equals the ratio between the total number of processor units (in this embodiment 16) and the number of divisions Nk. Therefore, the first modified object detection device can divide images so that the matching processing load for each processor unit is relatively uniform.

In particular, the first modified object detection device is useful when the transfer time for transferring images to the processor units is sufficiently small as compared to the processing time necessary for matching processing by the processor units.

Embodiment 3

Overview

As an embodiment of an object detection device according to the present invention, the following describes a second modified image processing device that is a partial modification of the first modified image processing device according to Embodiment 2. The second modified image processing device has the same hardware configuration as the first modified image processing device according to Embodiment 2. A portion of the executed software, however, is modified from the first modified image processing device according to Embodiment 2. Furthermore, the second modified image processing device includes a second modified object detection device that is a modification of the first modified object detection device in the first modified image processing device according to Embodiment 2.

The first modified object detection device according to Embodiment 2 is an example of a structure to calculate the number of divisions Nk taking into consideration the processing load for matching processing performed by the processor units. By contrast, the second modified object detection device is an example of a structure to calculate the number of divisions Nk taking into consideration the number of pixels that can be stored in the LM (local memory) of each processor unit.

The following describes the structure of the second modified object detection device according to Embodiment 3 with reference to the drawings, focusing on the differences from the first modified object detection device according to Embodiment 2.

Structure

In the second modified object detection device, the PE execution management unit 260 (see FIG. 2) and the division unit 800 (see FIG. 8) of the first modified object detection device according to Embodiment 2 (see FIG. 2) are respectively modified to a modified PE execution management unit (not shown in the figures) and a division unit 1200.

Accordingly, the modified PE execution management unit and the division unit 1200 are described below.

The division unit 1200 is implemented by the controller 119 executing a program. In addition to the division function and the address generation function that the division unit 800 according to Embodiment 2 has, the division unit 1200 has the following second modified calculation of number of divisions function.

Second modified calculation of number of divisions function: a function to calculate the number of divisions Nk for each image so as to balance the processing load for matching processing to be performed by the processor units on the original image and all of the reduced images.

Details on the method of calculating the number of divisions Nk for each image in the second modified calculation of number of divisions function are provided below in the section on second modified division processing.

Figure 12:
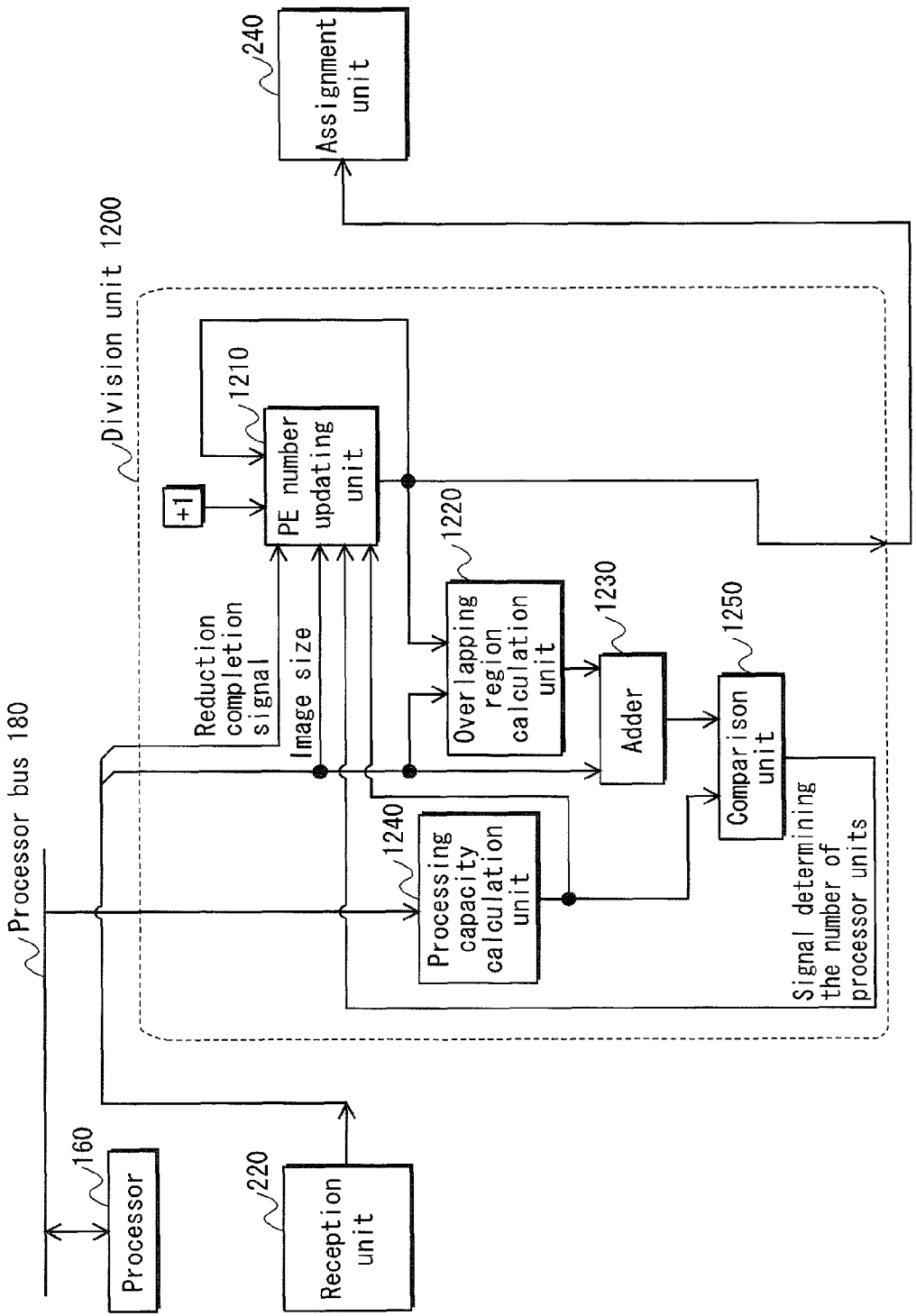
FIG. 12 is a functional block diagram of a division unit 1200.

FIG. 12 is a functional block diagram showing the functional structure of the division unit 1200.

As shown in FIG. 12, the division unit 1200 includes a PE number updating unit 1210, an overlapping region calculation unit 1220, an adder 1230, a processing capacity calculation unit 1240, and a comparison unit 1250.

The processing capacity calculation unit 1240 is implemented by the controller 119 executing a program and is connected to the processor bus 180, the PE number updating unit 1210, and the comparison unit 1250. The processing capacity calculation unit 1240 has a function to store the number of pixels that can be stored in the LM (local memory) of each processor unit (hereinafter referred to as "LM number of pixels") as received from the processor 160 via the processor bus 180. In the present embodiment, the LM number of pixels is assumed to be set to 16,000.

The PE number updating unit 1210 is implemented by the controller 119 executing a program. The PE number updating unit 1210 is connected to the reception unit 220, the overlapping region calculation unit 1220, the processing capacity calculation unit 1240, the comparison unit 1250, and the assignment unit 240 and has the following three functions.

Temporary number of divisions calculation function: a function to calculate a temporary number of divisions for an image corresponding to a reduced image ID based on the number of pixels corresponding to the reduced image ID as received from the reception unit 220 and the LM number of pixels stored by the processing capacity calculation unit 1240.

The temporary number of divisions is calculated as the largest value for which division of the number of pixels by the temporary number of divisions results in a number of pixels that does not exceed the LM number of pixels. If the temporary number of divisions is greater than or equal to the number of processor units (in this embodiment, 16), then the number of divisions is calculated to be 16.

Temporary number of divisions updating function: a function to calculate a new temporary number of divisions by incrementing the temporary number of divisions by one when the temporary number of divisions is not equal to or greater than 16. This function is performed when the PE number updating unit 1210 has calculated the temporary number of divisions and when a signal determining the number of processor units (described below) that has a logical value of 0 is received from the comparison unit 1250.

Number of divisions calculation function: a function, performed when the PE number updating unit 1210 has calculated the temporary number of divisions and a signal determining the number of processor units that has a logical value of one is received from the comparison unit 1250, to calculate the number of divisions as equaling the temporary number of divisions and to output the number of divisions to the assignment unit 240.

The overlapping region calculation unit 1220 is implemented by the controller 119 executing a program and is connected to the reception unit 220, the PE number updating unit 1210, and the adder 1230. The overlapping region calculation unit 1220 has a function to calculate the total number of pixels in overlapping regions yielded by dividing an image into divided images equal in number to the temporary number of divisions. The overlapping region calculation unit 1220 bases this calculation on the temporary number of divisions calculated by the PE number updating unit 1210 and on the number of pixels received from the reception unit 220.

The adder 1230 is implemented by the controller 119 executing a program and is connected to the reception unit 220, the overlapping region calculation unit 1220, and the comparison unit 1250. The adder 1230 has a function to calculate, based on the total number of pixels in overlapping regions calculated by the overlapping region calculation unit 1220 and on the number of pixels received from the reception unit 220, the number of pixels in the image on which one processor unit is to perform matching processing (hereinafter referred to as the "number of pixels in the divided image").

The comparison unit 1250 is implemented by the controller 119 executing a program and is connected to the adder 1230, the processing capacity calculation unit 1240, and the PE number updating unit 1210. The comparison unit 1250 has a function to compare the number of pixels in the divided image calculated by the adder 1230 and the LM number of pixels stored by the processing capacity calculation unit 1240, a function to output a signal determining the number of processor units that has a logical value of 0 when the number of pixels in the divided image is larger than the LM number of pixels, and a function to output a signal determining the number of processor units that has a logical value of 1 when the number of pixels in the divided image is not larger than the LM number of pixels.

The modified PE execution management unit (not shown in the figures) is implemented by the controller 119 executing a program and, like the PE execution management unit 260 in Embodiment 2, is connected to the $1^{st}$ processor unit 201 through the $16^{th}$ processor unit 204, the assignment unit 240, and the image reception unit 270 (see FIG. 2). In addition to the image transfer function and the completion notification function of the PE execution management unit 260 according to Embodiment 2, the modified PE execution management unit has the following partial transfer function.

Partial transfer function: a function to transfer a divided image to a processor unit by repeatedly performing partial transfer having a transfer load smaller than the LM number of pixels. During transfer of a divided image read by the image reception unit 270 to the processor unit assigned by the assignment unit 240, this function is performed when the number of pixels in the divided image read by the image reception unit 270 is larger than the number of pixels that can be stored in the LM (local memory) of each processor unit (hereinafter referred to as the "LM number of pixels").

With reference to the drawings, the following describes operations by the second modified object detection device provided with the above structure.

Operations

The following describes characteristic operations among operations by the second modified object detection device, namely second modified division processing.

Second Modified Division Processing

The second modified division processing is a modification of the first modified division processing in Embodiment 2, whereby the second modified object detection device calculates the number of divisions Nk for each image.

Figure 13:
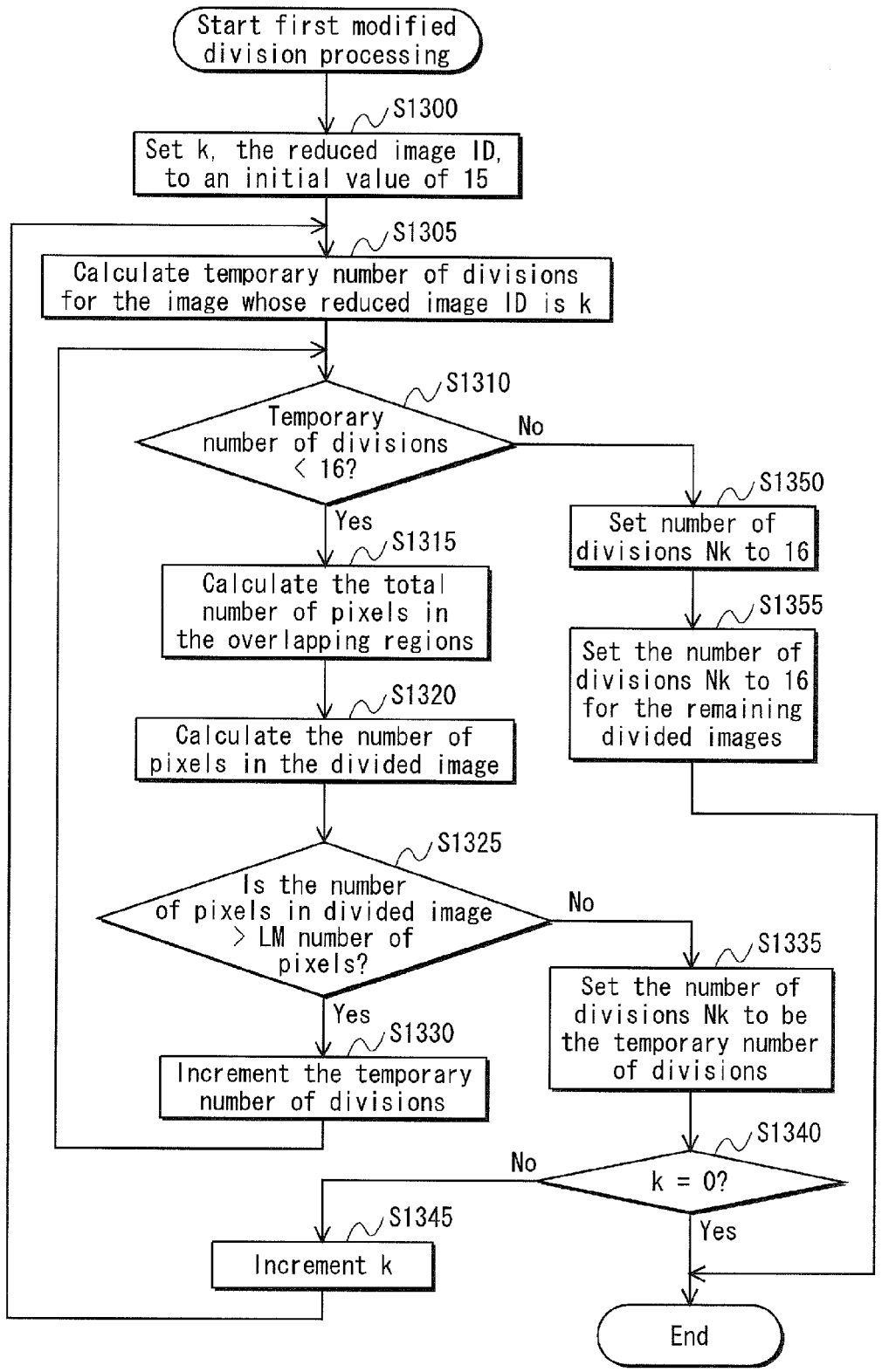
FIG. 13 is a flowchart of second modified division processing.

FIG. 13 is a flowchart of the second modified division processing.

The second modified division processing begins when the reduced image generation unit 210 transmits a reduction completion signal to the reception unit 220 during the processing in step S910 of first object detection processing (see FIG. 9).

Upon the start of the second modified division processing, the PE number updating unit 1210 sets k, the reduced image ID, to an initial value of 15 (step S1300). This initial value of 15 is the sum of the number of original images, i.e. 1, and the number of reduced images, i.e. 14.

Next, the PE number updating unit 1210 calculates the temporary number of divisions for the image whose reduced image ID is k (step S1305) and determines whether the calculated temporary number of divisions is less than the number of processor units, i.e. 16 (step S1310).

If the temporary number of divisions is less than 16 in step S1310 (step S1310: yes), the overlapping region calculation unit 1220 calculates the total number of pixels in the overlapping regions yielded by dividing the image whose reduced image ID is k into divided images equal in number to the temporary number of divisions (step S1315). The adder 1230 then calculates the number of pixels in the divided image (step S1320).

Once the number of pixels in the divided image is calculated, the comparison unit 1250 compares the number of pixels in the divided image with the LM number of pixels stored by the processing capacity calculation unit 1240 to determine whether the number of pixels in the divided image is larger than the LM number of pixels (step S1325).

If the number of pixels in the divided image is larger than the LM number of pixels in step S1325 (step S1325: Yes), the comparison unit 1250 outputs a signal determining the number of processor units that has a logical value of 0. The PE number updating unit 1210 then increments the temporary number of divisions by one (step S1330), and processing is repeated from step S1310 onwards.

If the number of pixels in the divided image is not larger than the LM number of pixels in step S1325 (step S1325: No), the comparison unit 1250 outputs a signal determining the number of processor units that has a logical value of 1. The PE number updating unit 1210 then calculates the number of divisions Nk to be the temporary number of divisions (step S1335) and determines whether k is 0 (step S1340).

If k is not 0 in step S1340 (step S1340: No), the PE number updating unit 1210 decrements k by one (step S1345), and processing is repeated from step S1305 onwards.

If the temporary number of divisions is not less than 16 in step S1310 (step S1310: No), the overlapping region calculation unit 1220 calculates the number of divisions Nk to be 16 (step S1350). The overlapping region calculation unit 1220 also sets the number of divisions Nk to 16 for all images with a smaller reduced image ID than k (step S1355).

Upon termination of the processing in step S1355, or if k is 0 in step S1340 (step S1340: Yes), the second modified object detection device terminates the second modified division processing.

FIG. 14 shows each number of divisions Nk calculated during the second modified division processing given that X0 is 640, Y0 is 400, Rx is 0.9, Ry is 0.9, Rt is 0.5, GDB is 16, and the LM number of pixels is 16,000.

In FIG. 14, the reduced image ID 1410, the width (pixels) 1420, the height (pixels) 1430, the number of pixels 1440, the number of PEs 1450, the number of overlapping region pixels 1460, and the number of pixels per processor unit 1470 are the same as the reduced image ID 1110, the width (pixels) 1120, the height (pixels) 1130, the number of pixels 1140, the number of PEs 1150, the number of overlapping region pixels 1160, and the number of pixels per processor unit 1170 in FIG. 11.

Considerations

The second modified object detection device with the above structure determines the number of divisions Nk of an image using the LM number of pixels as an upper limit. This is not always the case, however, if the number of divisions Nk equals the number of PEs, i.e. 16. If the number of divisions Nk is less than the number of PEs, i.e. 16, then each processor unit can store the entire image on which the processor unit performs matching processing within the LM of the processor unit.

Supplementary Explanation

As embodiments of an object detection device according to the present invention, examples of three image processing devices have been described, respectively in Embodiments 1 through 3. However, the present invention is of course not limited to the above embodiments. For example, the following modifications are possible.

(1) In Embodiment 1, the object detection device 110 is an example of a structure having a function to detect the face of a person appearing in an image by using a template image having characteristics of a person's face in order. The object that is the target of detection is not, however, limited to a person's face, but may be any object that might appear in an image, such as a cat, an automobile, or the like.

One possible example is a structure with a function to detect a cat included in an image by using a template image having characteristics of a cat.

(2) In Embodiment 1, the object detection device 110 is an example of a structure provided with 16 processor elements, but as long as a plurality of processor elements that can operate independently are provided, the number of processor elements is not limited to 16. For example, 64 processor elements may be provided.

(3) In Embodiment 1, the object detection device 110 is an example of a structure that generates 15 reduced images by successively reducing an original image at a 0.9 vertical reduction rate and a 0.9 horizontal reduction rate. As long as one or more reduced images are generated by reducing an original image, however, the number of reduced images is not limited to 15, nor are the vertical reduction rate and horizontal reduction rate limited to 0.9.

One possible example is a structure to generate 20 reduced images by successive reduction at a 0.95 vertical reduction rate and a 0.95 horizontal reduction rate.

Another possible example is a structure to generate 5 reduced images by successive reduction at a 0.8 vertical reduction rate and a 0.6 horizontal reduction rate.

(4) In Embodiment 1, the object detection device 110 is an example of a structure in which the division unit 230 generates divided images by dividing an image vertically. As long as divided images are generated so that processor units can independently perform matching processing, however, the generation of divided images is not limited to vertical division of an image. For example, divided images may be generated by dividing an image horizontally, or by dividing an image both horizontally and vertically into a grid. Furthermore, divided images may be generated while varying the division method by reduced image ID.

Figure 15A:
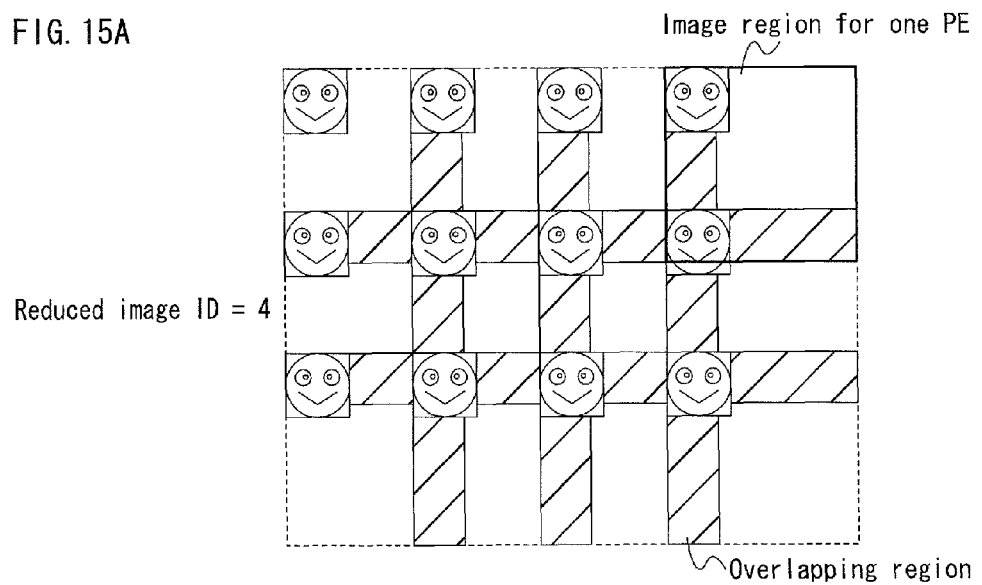
FIGS. 15A, 15B, and 15C are schematic diagrams schematically illustrating generation of divided images in a modification.
Figure 15B:
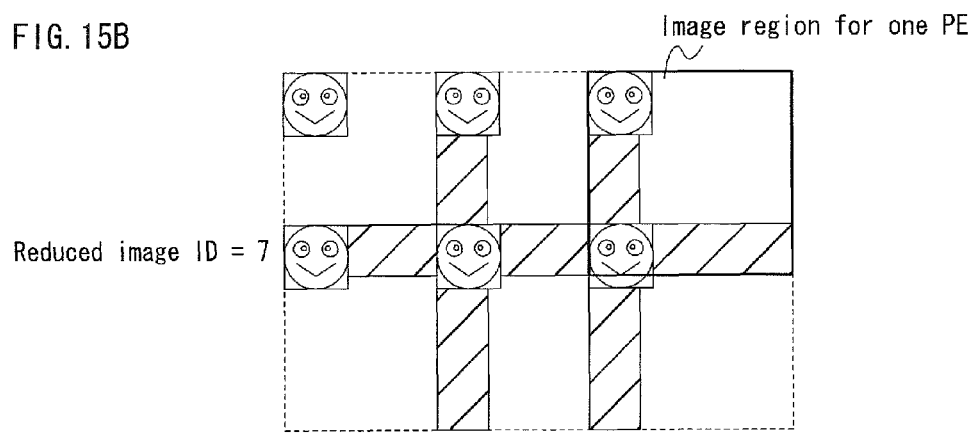
Figure 15C:
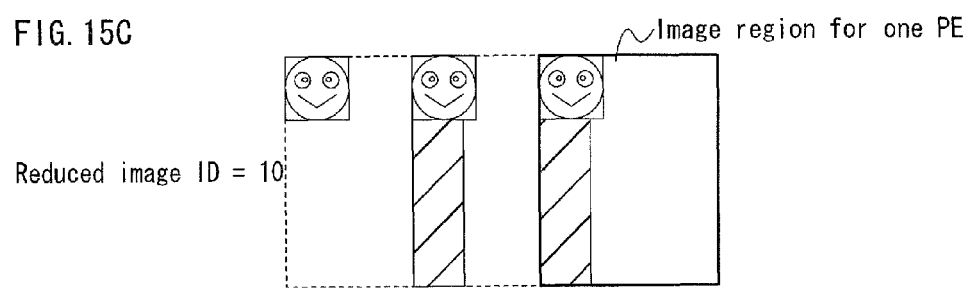

FIGS. 15A, 15B, and 15C are schematic diagrams schematically showing an example of generation of divided images by a third modified object detection device provided with a modified division unit modified to generate divided images by varying the division method by reduced image ID.

As shown in FIGS. 15A through 15C, the third modified object detection device generates 12 divided images by dividing an image horizontally and vertically into a grid when the reduced image ID of the image is 4, generates 6 divided images by dividing an image horizontally and vertically into a grid when the reduced image ID of the image is 7, and generates 3 divided images by dividing an image vertically when the reduced image ID of the image is 10.

(5) In Embodiment 1, the object detection device 110 is an example of a structure in which each processor unit performs matching processing by scanning a 20 pixel×20 pixel template image over an image from the upper left to the lower right, shifting the template image four pixels at a time. As long as an object can be detected in an image, however, the template image is not limited to being 20 pixels×20 pixels, nor is the number of pixels when shifting the template image limited to four. Furthermore, the order of scanning is not limited to going from the upper left to the lower right.

One possible example is a structure in which the template image is 15 pixels×10 pixels, the number of pixels by which the template image is shifted is two, and scanning is performed from the lower right to the upper left.

(6) In Embodiment 1, the object detection device 110 is an example of a structure in which the assignment unit 240 assigns divided images to PEs by performing steps S630 through S655 of object detection processing (see FIG. 6). As long as divided images are assigned to PEs so that PEs can operate efficiently with respect to one another, however, it is not absolutely necessary to assign divided images to PEs by performing the object detection processing in steps S630 through S655. One possible example is a structure in which all divided images are assigned to PEs upon completion of step S630.

Furthermore, images may be assigned so that divided images that share overlapping regions are assigned to the same PE. This structure reduces the number of times that pixels in shared overlapping regions are transferred.

(7) In Embodiment 1, the object detection device 110 is an example of a structure in which Rt is 0.5. The value of Rt, however, is highly dependent on the hardware configuration of the object detection device 110. Accordingly, the value of Rt may be a value other than 0.5 depending on the hardware configuration of the object detection device 110.

(8) In Embodiment 1, the object detection device 110 is an example of a structure in which scanning of an image continues during the matching processing performed by each processor unit even if a person's face is detected while scanning the image, with processing continuing until the entire image has been scanned. Another possible example is a structure in which the matching processing by each processor unit concludes upon detection of a person's face during scanning of the image. Yet another possible example is a structure in which the matching processing by each processor unit concludes upon detection of the face of a predetermined number of people (such as 10) during scanning of the image.

(9) In Embodiment 3, the second modified object detection device is an example of a structure in which the upper limit on the number of divisions of each reduced image is the number of processor units, i.e. 16. Another possible example is a structure with no upper limit on the number of divisions. This allows for the number of pixels in every divided image to be equal to or less than the LM number of pixels.

(10) In Embodiment 3, the second modified object detection device is an example of a structure in which the threshold for determining the number of divisions Nk of an image is the LM number of pixels. The threshold for determining the number of divisions Nk of an image, however, is not be limited to the LM number of pixels and may be determined by a different hardware resource.

(11) The above embodiments and modifications may be combined with one another.

(12) The following describes the structure and advantageous effects of an object detection device, and modifications thereto, according to a further embodiment of the present invention.

(a) An object detection device according to an embodiment of the present invention is an object detection device for detecting an object in an image, comprising: a plurality of processor units each configured to refer to an image and perform detection processing to detect an object included in the image; a division unit configured to divide an image into N divided images, each having an overlapping portion with at least another one of the divided images, in order for each of the plurality of processor units to perform the detection processing independently; and a transfer unit configured to transfer the divided images divided by the division unit to the plurality of processor units, each of the processor units performing the detection processing by referring to a transferred image transferred thereto by the transfer unit, and the division unit determining the number N of divided images in accordance with a data amount of the overlapping portion in each divided image to be transferred by the transfer unit and with a processing load for the detection processing to be performed by each of the plurality of processor units.

With the above structure, the object detection device according to the present embodiment divides images while taking into consideration both the data amount for transfer of the overlapping regions to be performed by the transfer unit and the processing load for detection processing to be performed by each of the plurality of processor units.

Accordingly, when adopting an architecture to successively transfer images to processor elements, this object detection device has a high probability of a shorter processing time for detecting an object than a conventional device.

Figure 16:
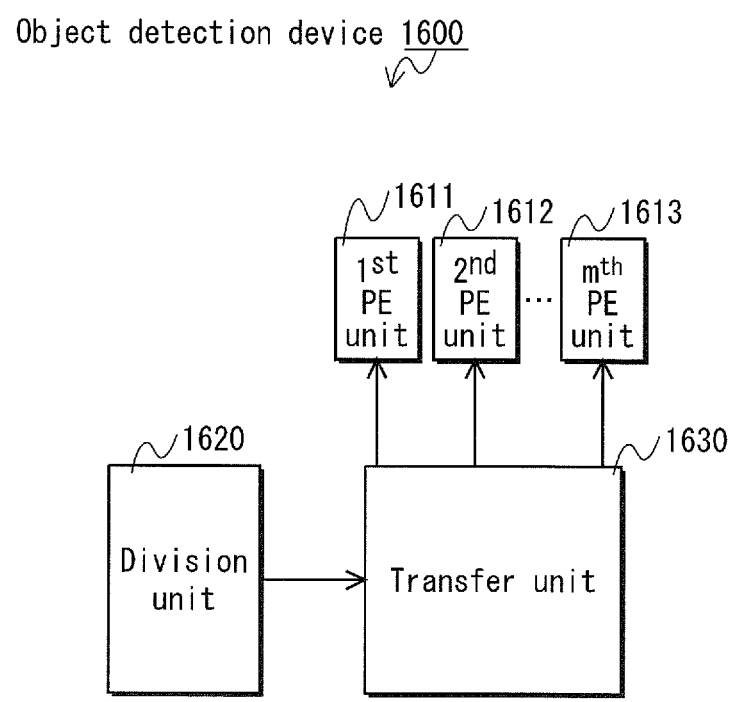
FIG. 16 is a structural diagram of an object detection device 1600.

FIG. 16 is a configuration diagram of an object detection device 1600 according to the above modification.

As shown in FIG. 16, the object detection device 1600 includes m processor units, i.e. a $1^{st}$ processor unit 1661 through an $m^{th}$ processor unit 1613, a division unit 1620, and a transfer unit 1630.

Each of the $1^{st}$ processor unit 1661 through the $m^{th}$ processor unit 1613 is a processor element unit that is connected to the transfer unit 1630, refers to an image, and performs detection processing to detect an object included in the image. The processor units are, for example, implemented as the $1^{st}$ processor unit 201 in Embodiment 1.

The transfer unit 1630 transfers divided images divided by the division unit 1620 to processor elements assigned by the division unit 1620. The transfer unit 1630 is, for example, implemented as the transfer unit 250 in Embodiment 1.

The division unit 1620 divides an image into N divided images each having an overlapping portion with at least one of the other N divided images in order for each of the m processor element units (the $1^{st}$ processor unit 1611 through the $m^{th}$ processor unit 1613) to perform the detection processing independently. The division unit 1620 determines the number N of divided images in accordance with a data amount of the overlapping portion in each divided image to be transferred by the transfer unit and with a processing load for the detection processing to be performed by each of the plurality of processor element units. The division unit 1620 is, for example, implemented as a combination of the division unit 230 and the assignment unit 240 in Embodiment 1.

(b) The object detection device may further comprise a reception unit configured to receive an original image and one or more reduced images that are reductions of the original image. The division unit may determine whether to divide each image received by the reception unit in accordance with the data amount of the overlapping portion in each divided image to be transferred by the transfer unit and with the processing load for the detection processing to be performed by each of the plurality of processor units. The transfer unit may further be configured to transfer any images that the division unit determines not to divide to the plurality of processor units.

This structure allows the object detection device to detect an object in an original image and in one or more reduced images that are reductions of the original image.

(c) The object detection device may further comprise a reduced image generation unit configured to generate one or more reduced images that are reductions of the original image. The reduced images received by the reception unit may be the reduced images generated by the reduced image generation unit.

This structure allows the object detection device to use an original image to detect an object in the original image and in one or more reduced images of the original image.

This structure allows the (d) The plurality of processor units may each include a local memory for storing the transferred image transferred thereto by the transfer unit and each perform the detection processing by referring to the image stored in the corresponding local memory. The division unit may make the determination and divide each image so that a data size of each image to be transferred by the transfer unit is at most a storage capacity of an image storage region in the local memory.

This structure allows each of the processor units to store all of the data for the image that is the target of object detection processing in the local memory of the processor unit.

(e) The plurality of processor units may each include a local memory for storing the transferred image transferred thereto by the transfer unit. When a data amount of an image to be transferred exceeds a storage capacity of an image storage region in the local memory, the transfer unit may transfer the image to the processor unit through repeated partial transfer, a data amount transferred during each partial transfer equaling at most the storage capacity of the image storage region in the local memory.

This structure allows the transfer unit to transfer an amount of data, during a partial transfer, that is equal to or less than the capacity of the image storage region in the local memory.

(f) The plurality of processor units may each include a characteristic information storage unit for storing information indicating characteristics of the object to be detected during the detection processing, and perform the detection processing using the characteristic information stored by the characteristic information storage unit.

This structure allows each of the processor elements to perform the object detection processing using characteristic information stored therein.

INDUSTRIAL APPLICABILITY

The present invention is widely applicable to devices having a function to detect an object in an image.

[Reference Signs List]

| | |
|---|---|
| 100 | image processing device |
| 110 | object detection device |
| 111-114 | $1^{st}$ PE-$16^{th}$ PE |
| 115-118 | $1^{st}$ LM-$16^{th}$ LM |
| 119 | controller |
| 120 | image pickup device |
| 130 | input processing circuit |
| 140 | main memory |
| 150 | image memory |
| 160 | processor |
| 170 | memory bus |
| 180 | processor bus |
| 201-204 | $1^{st}$ processor unit-$16^{th}$ processor unit |
| 210 | reduced image generation unit |
| 220 | reception unit |
| 230 | division unit |
| 240 | assignment unit |
| 250 | transfer unit |
| 260 | PE execution management unit |
| 270 | image reception unit |

The invention claimed is:

1. An object detection device for detecting an object in an image, comprising:

a plurality of processor units each configured to refer to an image and perform detection processing to detect an object included in the image;

a division unit configured to divide an image into N divided images, each having an overlapping portion with at least another one of the divided images, in order for each of the plurality of processor units to perform the detection processing independently; and a transfer unit configured to transfer the divided images divided by the division unit to the plurality of processor units, each of the processor units performing the detection processing by referring to a transferred image transferred thereto by the transfer unit, and the division unit determining the number N of divided images in accordance with a data amount of the overlapping portion in each divided image to be transferred by the transfer unit and with a processing load for the detection processing to be performed by each of the plurality of processor units.

2. The object detection device of claim 1, further comprising:

a reception unit configured to receive an original image and one or more reduced images that are reductions of the original image, wherein the division unit determines whether to divide each image received by the reception unit in accordance with the data amount of the overlapping portion in each divided image to be transferred by the transfer unit and with the processing load for the detection processing to be performed by each of the plurality of processor units, and the transfer unit is further configured to transfer any images that the division unit determines not to divide to the plurality of processor units.

3. The object detection device of claim 2, further comprising:

a reduced image generation unit configured to generate one or more reduced images that are reductions of the original image, wherein the reduced images received by the reception unit are the reduced images generated by the reduced image generation unit.

4. The object detection device of claim 3, wherein the plurality of processor units each include a local memory for storing the transferred image transferred thereto by the transfer unit and each perform the detection processing by referring to the image stored in the corresponding local memory, and the division unit makes the determination and divides each image so that a data size of each image to be transferred by the transfer unit is at most a storage capacity of an image storage region in the local memory.

5. The object detection device of claim 3, wherein the plurality of processor units each include a local memory for storing the transferred image transferred thereto by the transfer unit, and when a data amount of an image to be transferred exceeds a storage capacity of an image storage region in the local memory, the transfer unit transfers the image to the processor unit through repeated partial transfer, a data amount transferred during each partial transfer equaling at most the storage capacity of the image storage region in the local memory.

6. The object detection device of claim 3, wherein
the plurality of processor units each
include a characteristic information storage unit for storing information indicating characteristics of the object to be detected during the detection processing, and
perform the detection processing using the characteristic information stored by the characteristic information storage unit.

7. An image dividing device for dividing an image into N divided images each having an overlapping portion with at least one of the other divided images in order for each of a plurality of processor units to perform the detection processing independently, the plurality of processor units each referring to an image and performing the detection processing to detect an object included in the image, wherein
the number N of divided images is determined in accordance with a data amount of the overlapping portion in each divided image to be transferred to the plurality of processor units and with a processing load for the detection processing to be performed by each of the plurality of processor units.

8. An integrated circuit for detecting an object in an image, comprising:
a plurality of processor units each configured to refer to an image and perform detection processing to detect an object included in the image;
a division unit configured to divide an image into N divided images, each having an overlapping portion with at least another one of the divided images, in order for each of the plurality of processor units to perform the detection processing independently; and
a transfer unit configured to transfer the divided images divided by the division unit to the plurality of processor units,
each of the processor units performing the detection processing by referring to a transferred image transferred thereto by the transfer unit, and
the division unit determining the number N of divided images in accordance with a data amount of the overlapping portion in each divided image to be transferred by the transfer unit and with a processing load for the detection processing to be performed by each of the plurality of processor units.

9. An object detection method for controlling an object detection device for detecting an object in an image, the object detection device being provided with a plurality of processor units each configured to refer to an image and perform detection processing to detect an object included in the image, the object detection method comprising the steps of:
(a) dividing an image into N divided images, each having an overlapping portion with at least another one of the divided images, in order for each of the plurality of processor units to perform the detection processing independently; and
(b) transferring the divided images divided in step (a) to the plurality of processor units, wherein
in step (a), the number N of divided images is determined in accordance with a data amount of the overlapping portion in each divided image to be transferred in step (b) and with a processing load for the detection processing to be performed by each of the plurality of processor units.

10. A non-transitory object detection program stored in computer readable medium for causing an object detection device to perform object detection processing to detect an object in an image, the object detection device being provided with a plurality of processor units each configured to refer to an image and perform detection processing to detect an object included in the image, the object detection processing comprising the steps of: (a) dividing an image into N divided images, each having an overlapping portion with at least another one of the divided images, in order for each of the plurality of processor units to perform the detection processing independently; and (b) transferring the divided images divided in step (a) to the plurality of processor units, wherein in step (a), the number N of divided images is determined in accordance with a data amount of the overlapping portion in each divided image to be transferred in step (b) and with a processing load for the detection processing to be performed by each of the plurality of processor units.

11. A computer readable recording medium having recorded thereon a non-transitory object detection program for causing an object detection device to perform object detection processing to detect an object in an image, the object detection device being provided with a plurality of processor units each configured to refer to an image and perform detection processing to detect an object included in the image, the object detection processing comprising the steps of: (a) dividing an image into N divided images, each having an overlapping portion with at least another one of the divided images, in order for each of the plurality of processor units to perform the detection processing independently; and (b) transferring the divided images divided in step (a) to the plurality of processor units, wherein in step (a), the number N of divided images is determined in accordance with a data amount of the overlapping portion in each divided image to be transferred in step (b) and with a processing load for the detection processing to be performed by each of the plurality of processor units.

* * * * *